United States Patent
Lee et al.

(10) Patent No.: US 8,194,613 B2
(45) Date of Patent: Jun. 5, 2012

(54) METHOD OF TRANSMITTING PROTOCOL MESSAGE FOR MEDIA INDEPENDENT HANDOVER IN WIRELESS ACCESS SYSTEM

(75) Inventors: Jin Lee, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 12/451,887

(22) PCT Filed: May 27, 2008

(86) PCT No.: PCT/KR2008/002958
§ 371 (c)(1),
(2), (4) Date: Dec. 4, 2009

(87) PCT Pub. No.: WO2008/150078
PCT Pub. Date: Dec. 11, 2008

(65) Prior Publication Data
US 2010/0118771 A1    May 13, 2010

Related U.S. Application Data

(60) Provisional application No. 60/942,449, filed on Jun. 6, 2007.

(30) Foreign Application Priority Data

Aug. 7, 2007  (KR) .................. 10-2007-0079183
Aug. 7, 2007  (KR) .................. 10-2007-0079184
Apr. 1, 2008  (KR) .................. 10-2008-0030372

(51) Int. Cl.
*H04W 4/00*     (2009.01)
*H04W 36/00*    (2009.01)

(52) U.S. Cl. .............. 370/331; 370/338; 455/436
(58) Field of Classification Search .................. None
See application file for complete search history.

(56) References Cited

U.S. PATENT DOCUMENTS

| 2006/0274697 A1* | 12/2006 | Kim et al. | 370/331 |
| 2008/0008131 A1* | 1/2008 | Watfa et al. | 370/331 |
| 2008/0062926 A1* | 3/2008 | Oba | 370/331 |

FOREIGN PATENT DOCUMENTS

| WO | WO 2006/052563 A2 | 5/2006 |
| WO | WO 2006/109963 A2 | 10/2006 |
| WO | WO 2006/118410 A2 | 11/2006 |

OTHER PUBLICATIONS

Oba, MIH protocol Sate machine, Sep. 13, 2006, U.S. Appl. No. 60/825,567, pp. 1-225.*

Eunah Kim et al.: "Proposed Modification of the MIH Capability Discovery" IEEE 802.21 Media Independent Handover Services, Sep. 13, 2005, pp. 1-4, XP002486479.

* cited by examiner

*Primary Examiner* — Steven H Nguyen
(74) *Attorney, Agent, or Firm* — McKenna Long & Aldridge LLP

(57) ABSTRACT

Disclosed is a method of transmitting a media independent handover (MIH) protocol message in a wireless access system. A method for a mobile node to transmit an MIH message in a wireless access system includes receiving a primitive including prescribed information from a first entity, generating the MIH message by mapping a transport address to the primitive, and transmitting the MIH message to one or more network nodes. According to the present invention, transmission defects of the message are effectively reduced by accurately mapping an MIHF ID and a transport address.

12 Claims, 21 Drawing Sheets

METHOD OF TRANSMITTING PROTOCOL MESSAGE FOR MEDIA INDEPENDENT HANDOVER IN WIRELESS ACCESS SYSTEM

This application claims priority to International Application No. PCT/KR2008/002958, filed on May 27, 2008, which claims priority to U.S. Provisional Application No. 60/942,449, filed on Jun. 6, 2007, Korean Patent Application No. 10-2007-0079183, filed on Aug. 7, 2007, Korean Patent Application No. 10-2007-0079184, filed Aug. 7, 2007 and Korean Patent Application No. 10-2008-0030372, filed Apr. 1, 2008, all of which are incorporated by reference for all purposes as if fully set forth herein.

TECHNICAL FIELD

The present invention relates to a wireless communication system, a method of transmitting and broadcasting a media independent handover (MIH) protocol message.

BACKGROUND ART

A description will now be given of handover between different types of networks, that is, between heterogeneous networks, especially media independent handover (MIH) between heterogeneous networks.

IEEE 802.21, which is currently under development for international standards concerning MIH between heterogeneous networks, provides seamless handover between heterogeneous networks and service continuity to improve mobile node user convenience. IEEE 802.21 defines an MIH function, event trigger, a command service, and an information service (IS) as requirements.

In exemplary embodiments of the present invention, a mobile node is a multi-mode node supporting one or more interface types that may take various forms. For example, the interface types include a wire-line interface such as IEEE 802.3 based Ethernet, an IEEE 802.XX-series wireless interface including IEEE 802.11, IEEE 802.15, or IEEE 802.14, and an interface defined by a cellular standard organization such as 3GPP or 3GPP2.

A multi-mode mobile node has a physical layer and a media access control (MAC) layer of each mode. An MIH layer is located below an Internet protocol (IP) layer. An MIH function (MIHF) of the mobile node is a logic entity and is freely located within a protocol stack while interfacing with each layer through a service access point (SAP).

The MIH should be defined between IEEE 802 series interfaces or between an IEEE 802 series interface and a non-IEEE 802 series interface (for example 3GPP or 3GPP2). A mobility support protocol of an upper layer, such as a mobile IP and a session initiation protocol (SIP) should be supported for a seamless service.

However, a process for transferring a transport address according to an MIHF identifier (ID) is generally not clear when it is desired to transmit an MIH protocol message. Namely, when the MIH protocol message is transmitted, since the transport address is arbitrarily transmitted, without being setting up, according to the MIHF ID, a transmission error of the protocol message frequently occurs. Errors may be generated, especially when a multi-mode mobile node transmits and receives the protocol message for performing handover between heterogeneous networks, or for receiving an MIH service during and after registration between the mobile node and a network node. That is, if a process of mapping a transport address corresponding to an MIHF ID is not clear, a transmission error may be incurred during transmission of an MIH protocol message, thereby deteriorating quality of service.

DISCLOSURE

Technical Problem

An MIHF ID is a unique ID for MIHF and serves to identify an MIHF entity which provides an MIH service. The MIHF ID is used for MIH registration and all messages demanded by the MIHF entity.

If a source wishes to transmit an MIH protocol message to a destination, an MIHF ID of the destination and a transport address of the destination should be mapped so that a source can accurately transmit a message including data to a desired destination.

However, when a source broadcasts the MIH protocol message to any destination, the source cannot know MIHF IDs of MIH entities of all destinations. Therefore, there is no way to process the MIHF IDs of unknown destinations. Namely, a technical defect may occur at a transport connection part for transmitting the broadcast message.

An object of the present invention devised to solve the problem lies on providing a method of effectively transmitting an MIH protocol message.

Another object of the present invention is to provide a method of broadcasting a broadcast MIHF ID and a transport address in connection with each other when a source transmits an MIH protocol message.

Still another object of the present invention is to provide a method of binding an MIHF ID and a transport address so as to transmit an MIH protocol message even though a mobile node does not request MIH.

A further object of the present invention is to provide a method for a terminal, which has performed an MIHF discovery procedure, to effectively perform a registration procedure with a counterpart MIHF entity and to receive an efficient service after the registration procedure.

Technical Solution

The object of the present invention can be achieved by providing a method of transmitting an MIH protocol message in a wireless communication system. Moreover the present invention provides a method of binding a transport address to transmit an MIH protocol message of a broadcast form.

In one aspect of the present invention, a method of transmitting a media independence handover (MIH) request message includes: including a broadcast media independence handover function (MIHF) identifier (ID) configured as a predefined zero-length in a destination ID area of the MIH request message by a source MIHF entity; and broadcasting the MIH request message through a data plane by the source MIHF entity to an unknown destination MIHF entity.

The MIH request message may be one of an MIH discovery request message for discovering an MIHF ID of the destination entity and an MIH capability discovery request message for discovering MIH capability of the destination MIHF entity.

The method may further includes setting a timer for receiving an MIH response message to the MIH request message by the source MIHF entity, after broadcasting the MIH request message. The MIH request message may be used to discover an MIHF ID and MIH capability of the destination MIHF entity.

The source MIHF entity may complete an operation if the MIH response message is received during a setting interval of the timer, and the source MIHF entity may broadcast the MIH request message using a different transport if the MIH response message is not received during the setting time of the timer. The MIH response message may be transmitted as a response to the MIH request message only by an MIH network entity.

The data plane may be one of a second layer data plane and a third layer data plane. The MIH request message may include the source MIHF ID, the broadcast MIHF ID, source address information, and source MIH capability information in an MIH header. The source MIH capability information may include an MIH event list, an MIH command list, an MIH information list, and an MIH transport list that are supported by the source MIHF entity.

In another aspect of the present invention, a method of receiving a media independent handover (MIH) response message, comprising: receiving the MIH response message broadcast from an unknown media independent handover function (MIHF) entity through a data plane, wherein the MIH response message includes a broadcast MIHF identifier (ID) configured as a predefined zero-length and an ID of the MIHF entity; and transmitting a destination MIHF ID and destination MIHF capability information, included in the MIH response message, to an upper MIH user.

The data plane may be one of a second layer data plane and a third layer data plane. The MIH response message may further include MIH capability information of the MIHF entity. The MIH response message may further include a transport address of the MIHF entity. The MIH capability information of the MIHF entity may include an MIH event list, an MIH command list, an MIH information list, and an MIH transport list that are supported by the MIHF entity.

In still another aspect of the present invention, a method of transmitting a media independent handover (MIH) request message by a source, includes: broadcasting the MIH request message in an initial state by a media independent handover function (MIHF) entity of the source, wherein a broadcast identifier (ID) configured as a zero-length is included in a destination ID area of the MIH request message; and driving a timer for receiving a response to the MIH request message and transitioning to a state for waiting for the response to the MIH request message by the MIHF entity.

In a further aspect of the present invention, a method of transmitting a media independent handover (MIH) response message by a destination, includes: receiving an MIH request message through a data plane in an initial state, wherein the MIH request message includes a broadcast identifier (ID) which is broadcast in a media independent handover function (MIHF) entity of a source and includes an MIHF ID of the source; and driving a timer for transmitting the MIH response message and transitioning to a state for transmitting the MIH response message.

Advantageous Effects

The present invention has the following advantages. First, when a source broadcasts an MIH protocol message to any destination, a technical defect generated at a transport connection part can be solved by providing a method of accurately binding the MIH protocol message and a transport address.

Second, a method of effectively transmitting an MIH protocol message is provided by providing a broadcast MIHF ID of a zero-length string type.

Third, an efficient MIH service is provided by exchanging MIH capability information between network entities, and periodically broadcasting MIH capability in the form of a unicast or broadcast, even though a mobile node does not request MIH capability discovery.

Fourth, a message transmission defect does not occur by definitely mapping an MIHF ID and a transport address.

Fifth, a transmission defect of an MIH protocol message is effectively reduced in the course of receiving an MIH service from a network node by a mobile node after registration since a process of mapping an MIHF ID and a transport address is definite, thereby receiving more efficient MIH service.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
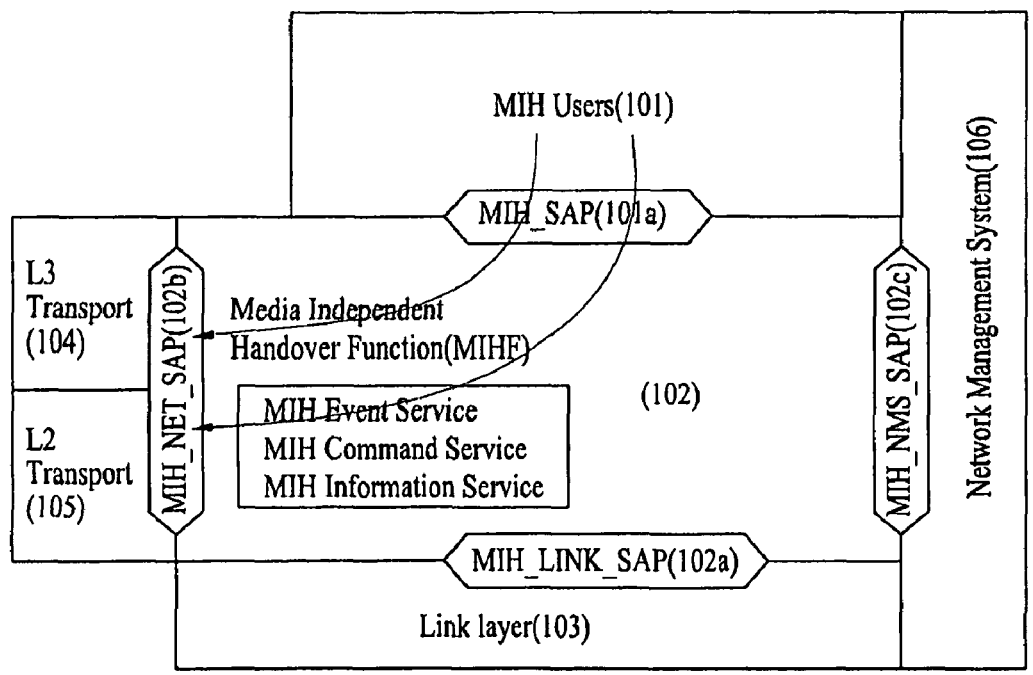
FIG. 1 is a diagram illustrating a process of passing through MIH_NET_SAP when an MIH protocol message is transmitted through a data plane.

To solve the above technical problem, the present invention provides a method of transmitting and broadcasting an MIH protocol message in a wireless communication system.

The following technology may be used in various communication systems. The communication systems may be widely used to provide various communication services such as voice and packet data. Such technology may be used for a downlink or an uplink. Downlink refers to communication from a network node or a base station (BS) to a mobile node or a mobile station (MS), and uplink refers to communication from the MS, etc. to the network node, etc. The term 'network node' generally refers to a fixed point or a fixed station communicating with the mobile node and may be replaced with other terminology such as node-B, base transceiver system (BTS), or access point (AP). The MS may be fixed or may have mobility. The mobile node may be replaced with other terminology such as user equipment (UE), user terminal (UT), subscriber station (SS), or wireless device.

Hereinafter, a brief description will be made of the terms used to explain exemplary embodiments of the present invention. The specific terms used herein are to provide a thorough understanding of the present invention. Therefore, it will be apparent to those skilled in the art that various modifications can be made without departing from the scope and spirit of the invention.

Media independent handover (MIH) between heterogeneous networks provides seamless handover between heterogeneous networks and service continuity to improve mobile node user convenience. A media independent handover function (MIHF) provides an asymmetric service such as an event service (ES), and a symmetric service such as a command service (CS) to upper layers and lower layers through a service access point (SAP). An MIH technique may provide an event service, a command service, and an information service (IS).

The event service is information transferred to upper layers from a link layer and the upper layers may receive the event service via a registration procedure. To perform handover, the upper layers including a mobility management protocol need to receive information indicating that handover is to be generated soon or link layer information indicating that handover has just been performed.

The event service is divided into a link event terminated at an MIHF from an entity generating an event in lower layers (under a second layer) and an MIH event propagated from upper layers (above a third layer) registered by the MIHF. The link event and the MIH event are further divided into local events and remote events according to a propagated area.

If events are transferred to a local MIHF from an event source within a local stack or to the upper layers from the local MIHF, such events are referred to as 'local events'. Remote events are the case where events are transferred to a remote MIHF from a remote event source or to the local MIHF from the remote MIHF.

The command service is commands transferred to lower layers (under a second layer) from upper layers (above a third layer) in order to determine a link status by upper layers and other MIH users and to control an optimized operation of a multi-mode device. Similarly to the event service, the command service is divided into a link command and an MIH command.

The link command and the MIH command are divided into a local command and a remote command according to a propagated area. A local MIH command is transmitted to an MIHF from upper layers. For example, the local MIH command is transmitted to an MIHF from a mobility management protocol of an upper layer or to the MIHF from a policy engine. A local link command is transferred to lower layers from an MIHF in order to control lower layer entities. For example, the local link command is transferred to a MAC layer from an MIHF or to a physical layer from the MIHF. A remote MIH command is transferred to a remote equal stack from upper layers. A remote link command is transferred to lower layers of the remote equal stack from the MIHF.

The information service provides a similar framework in a layer network in order to easily discover and select a variety of existing networks. That is, the information service provides detailed network information necessary for discovering and selecting a network and should be able to be accessed from any network. The information service enables a mobile node to acquire information for network selection before handover and to acquire available information through information query in order to reduce a delay after handover.

The information service includes information elements, such as a link access parameter, a security mechanism, an IP configuration method (e.g. IP address information), location information, provider and other access information, and cost of link.

An MIHF ID is used to identify an MIH entity in an MIH protocol. Two MIH entities are paired through an MIHF registration procedure. The MIHF ID includes an MIHF ID for unicast and an MIHF ID for broadcast. The broadcast MIHF ID may be used to simultaneously perform MIHF discovery and capability discovery procedures or to transmit a broadcast message for other purposes.

The following Table 1A illustrates an example of an MIHF ID format.

TABLE 1a

| Type | Length | Value |
|---|---|---|
| TYPE_HDR_TLV_MIHF | Variable | MIHF ID of a source where an MIHF frame is started/MIHF ID of a destination where MIHF frame is transmitted. |

In Table 1a, the MIHF ID of a registration request message transmitted by a source may be in full qualified domain name (FQDN) or network access identifier (NAI) format.

The following Table 1b illustrates another example of the MIHF ID format.

TABLE 1b

| Type | Format | Definition | Effective Area |
|---|---|---|---|
| MIHF_ID | OCTECT_STRING | MIHF ID<br>MIHF ID may be in FQDN or NAI format.<br>Broadcast MIHF ID may be in null (i.e., zero-length string) or 'unknown' format. | N/A |

In Table 1b, the MIHF ID includes an MIHF ID for unicast and an MIHF ID for a broadcast message. The broadcast MIHF ID may be used to simultaneously perform MIHF ID discovery and MIHF capability discovery procedures or to broadcast an MIH protocol message for other purposes.

FIG. 1 is a diagram illustrating a process of passing through MIH_NET_SAP when an MIH protocol message is transmitted through a data plane.

Referring to FIG. 1, the data plane includes an MIH user 101, an MIH_SAP 101a, an MIHF 102, an MIH_LINK_SAP 102a, an MIH_NET_SAP 102b, an MIH_NMS_SAP 102c, a link layer, 103, a second layer (L2) transport 105, a third layer (L3) transport 104, and a network management system 106.

The MIH user 101 transmits a primitive to the MIHF 102 through the MIH_SAP 101a which is an access point between layers. The MIH_SAP 101a is an access point between the MIHF 102 which is a medium independent interface and the MIH user 101. The MIH_NMS_SAP 102c is an access point between the network management system 106 which is a medium independent interface and the MIHF 102.

The MIHF 102 generates a protocol message using the received MIH_SAP primitive. The generated MIH protocol message is transmitted to a network node through the MIH_NET_SAP 102b. At this time, a transport address corresponding to an MIH ID (MIHF ID) is mapped to the MIH protocol message, and the MIH protocol message can be transmitted to the second layer 105 or the third layer 104 according to a transport type. It is assumed that each MIHF ID can be changed to the transport address.

As an example of the MIH protocol message, an MIH capability discovery request message (MIH_capability_discovery request) may not include an MIH message payload. The MIH capability discovery request message may be configured by an MIH header alone and a message type thereof may be set to '1'. The MIH capability discovery request message is transmitted through the second layer L2 or the third layer L3. If an entity transmitting the above message does not accurately know an address of a counterpart entity and wishes to find an MIH entity having an MIHF, the MIH capability discovery request message may be transmitted in broadcast form. Alternatively, if an entity transmitting the above message discovers an address of a counterpart entity but wishes to check whether the entity supports an MIHF, the message may be transmitted in unicast form.

In exemplary embodiments of the present invention, a primitive transmitted from the same entity is designated by '.' and a protocol message transmitted to a different entity uses a space instead of '.'. For example, an MIH primitive may be indicated as an MIH_capability_discovery.request primitive and an MIH protocol message may be expressed as an MIH_capability_discovery request protocol message.

Figure 2:
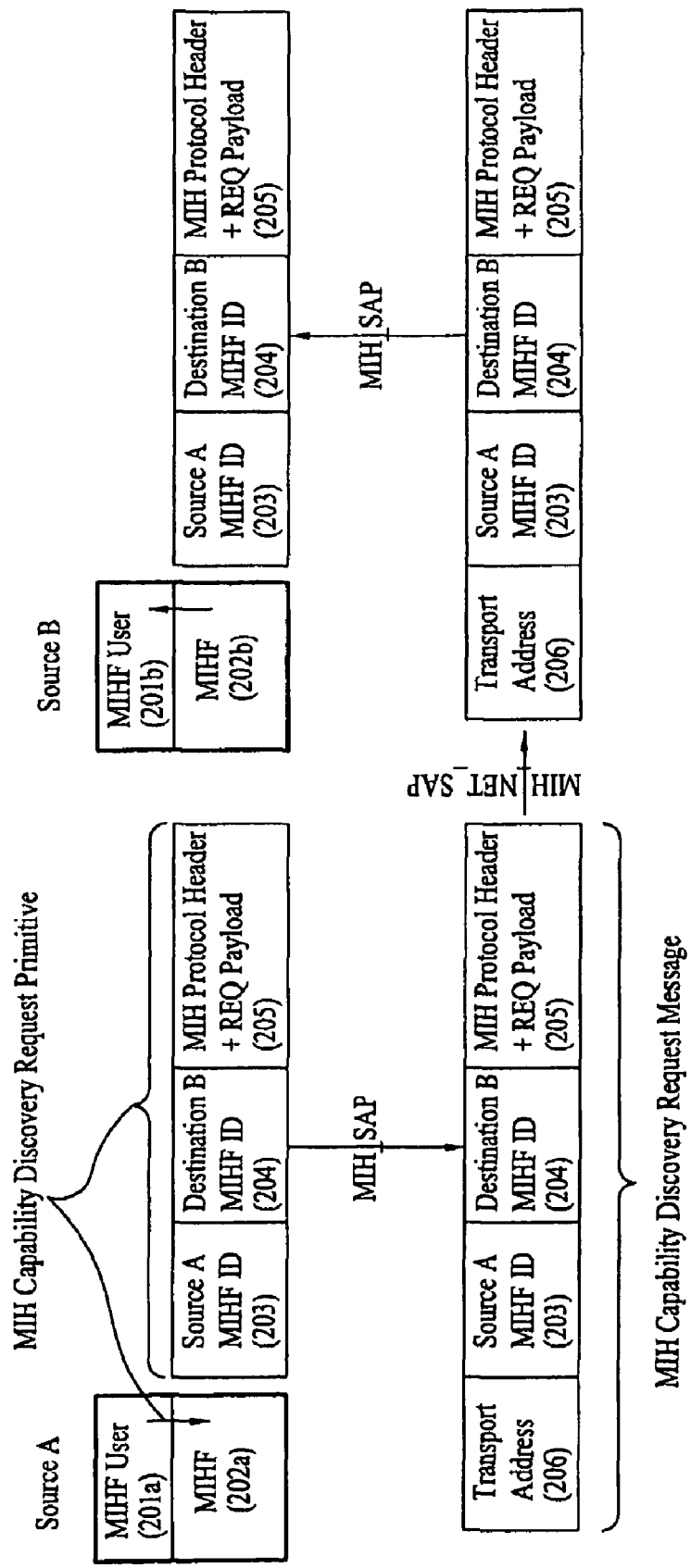
FIG. 2 is a diagram illustrating one of methods of generating an MIH capability discovery protocol message in association with an MIHF ID and a transport address by a source and transmitting the protocol message to a destination, according to an exemplary embodiment of the present invention.

FIG. 2 is a diagram illustrating one of methods of generating an MIH capability discovery protocol message in association with an MIHF ID and a transport address by a source and transmitting the protocol message to a destination, according to an exemplary embodiment of the present invention.

Referring to FIG. 2, an MIHF user 201a of a source A transmits an MIH capability discovery request primitive to an MIHF 202a of the source A. The MIH capability discovery request primitive may include an MIHF ID 203 of the source A, an MIHF ID 204 of a destination B, and an MIH protocol header and request (REQ) payload 205. The MIHF 202a of the source A generates an MIH capability discovery request protocol message using the MIH capability discovery request primitive.

The MIHF user 201a may include a broadcast MIHF ID in an area indicating the MIHF ID 204 of the destination B, in order to simultaneously perform a discovery procedure for an MIH ID of the destination B and a discovery procedure for MIH capability to determine whether an event service, a command service, and an information service can be provided. The broadcast MIHF ID may be expressed in zero-length string (ZLS) format indicated as a sequence of '0's or in 'unknown' format.

A transport address 206 may be included in the protocol message by being mapped with the MIHF ID 203 of the source A and the MIHF ID 204 of the destination B. The transport address 206 is mapped to the MIHF ID of the source A and the MIHF ID of the destination B.

In FIG. 2, the MIH capability discovery request protocol message is transmitted to an MIHF entity 202b of the destination B through a service access point MIH_NET_SAP. That is, since the MIHF IDs of the source and destination and the transport address are mapped and transmitted to the MIHF of the destination, the protocol message can be accurately transmitted. The MIHF entity 202b of the destination B receiving the MIH capability discovery request protocol message can transmit information included in the protocol message to an MIH user 201b through the MIH_NET_SAP.

If the MIHF discovery and MIH capability discovery procedures of a new destination are desired to be performed simultaneously, the MIHF 202a of the source A can arbitrarily transmit the MIH capability discovery request message. In this case, the source A transmits the MIH capability discovery request message including a broadcast MIHF ID (for example, zero-length string) in an area indicating the MIHF ID 204 of the destination B to the MIHF 202b of the destination B. Therefore, the MIHF 202b of the destination B receiving the MIH capability discovery request message can transmit the MIH capability discovery request message to the MIHF user 201b through the MIH_SAP.

In this case, the MIHF 202*b* of the destination transmits the protocol message to the MIHF user 201*b* thereof, even though the received protocol message includes another MIHF ID (for example, broadcast MIHF ID) in addition to the MIHF ID thereof, in order to process the received MIH protocol message if an action identifier (AID) indicates '1' indicating MIH_capability_discovery.

A general MIH capability discovery response message corresponds to the MIH capability discovery request message. Therefore, if an entity receiving the MIH capability discovery request message can provide an MIHF, the entity can respond through the MIH capability discovery response message.

The MIH capability discovery response message may be configured by an MIH header alone without including an MIH message payload and may be transmitted by setting a message type to '1'. The MIHF of the destination B generates the MIH capability discovery response message and transmits the message to the source A through the second or third layer. When the destination transmits the MIH capability discovery response message, a source address is copied to be filled in an area including a destination address within the MIH header and the destination address is included in an area including the source address. An entity having an MIHF may periodically advertise its MIHF through the second or third layer.

Figure 3:
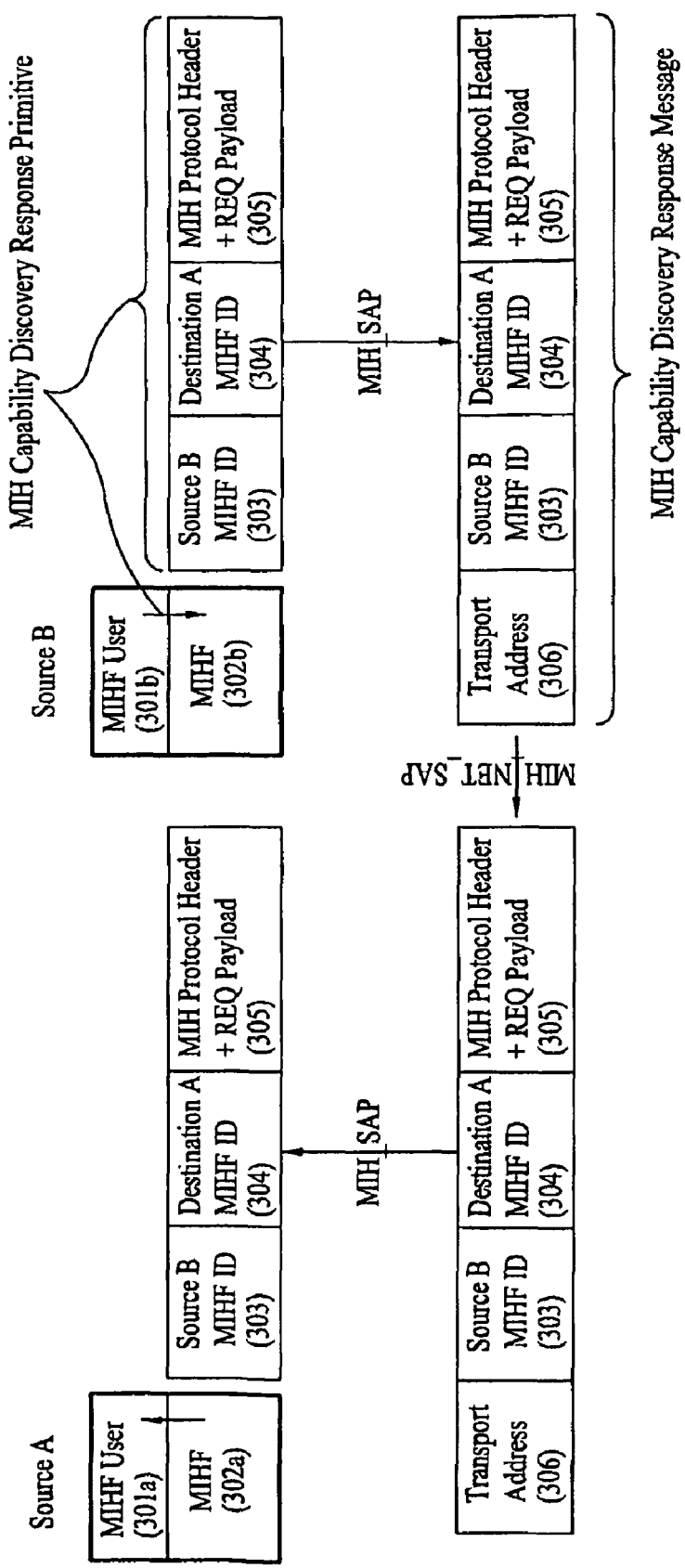
FIG. 3 is a diagram illustrating one of methods of generating an MIH capability discovery response protocol message in association with an MIHF ID and a transport address by a destination and generating the protocol message to a source, according to an exemplary embodiment of the present invention.

FIG. 3 is a diagram illustrating one of methods of generating an MIH capability discovery response protocol message in association with an MIHF ID and a transport address by a destination and transmitting the protocol message to a source, according to an exemplary embodiment of the present invention.

FIG. 3 shows a transmitting method corresponding to FIG. 2. A destination of FIG. 3 is the source of FIG. 2 and a source of FIG. 3 is the destination of FIG. 2.

Referring to FIG. 3, an MIHF user 301*b* of a source B a primitive (for example, MIH_Capability_discovery.response) included in an MIH capability discovery response message to an MIHF 302*b* of the source B. The MIHF 302*b* of the source B generates an MIH capability discovery response protocol message. The MIH capability discovery response protocol message includes an MIHF ID 303 of the source B, an MIHF ID 304 of a destination A, and an MIH protocol header and RSP payload 305. In this case, the MIHF 302*b* of the source B copies the MIHF ID 203 of the source A of the received protocol message in FIG. 2 in an area indicating the MIHF ID 304 of the source B included in the protocol message.

The MIHF 302*b* of the source B maps the MIHF ID of the destination A with a transport address of the destination A and generates a response protocol message. For example, the source B generates an MIH capability discovery response message in which the MIHF ID and the transport address are mapped and transmits the message to the destination through MIH_NET_SAP. An MIHF 302*a* of the destination A receiving the MIH capability discovery response message transmits information included in the MIH capability discovery response message to an MIHF user 301*a*. Therefore, MIHF IDs of the source and destination and transport addresses can accurately connected and a broadcast message or a unicast message can be transmitted without any transmission defect.

Figure 4:
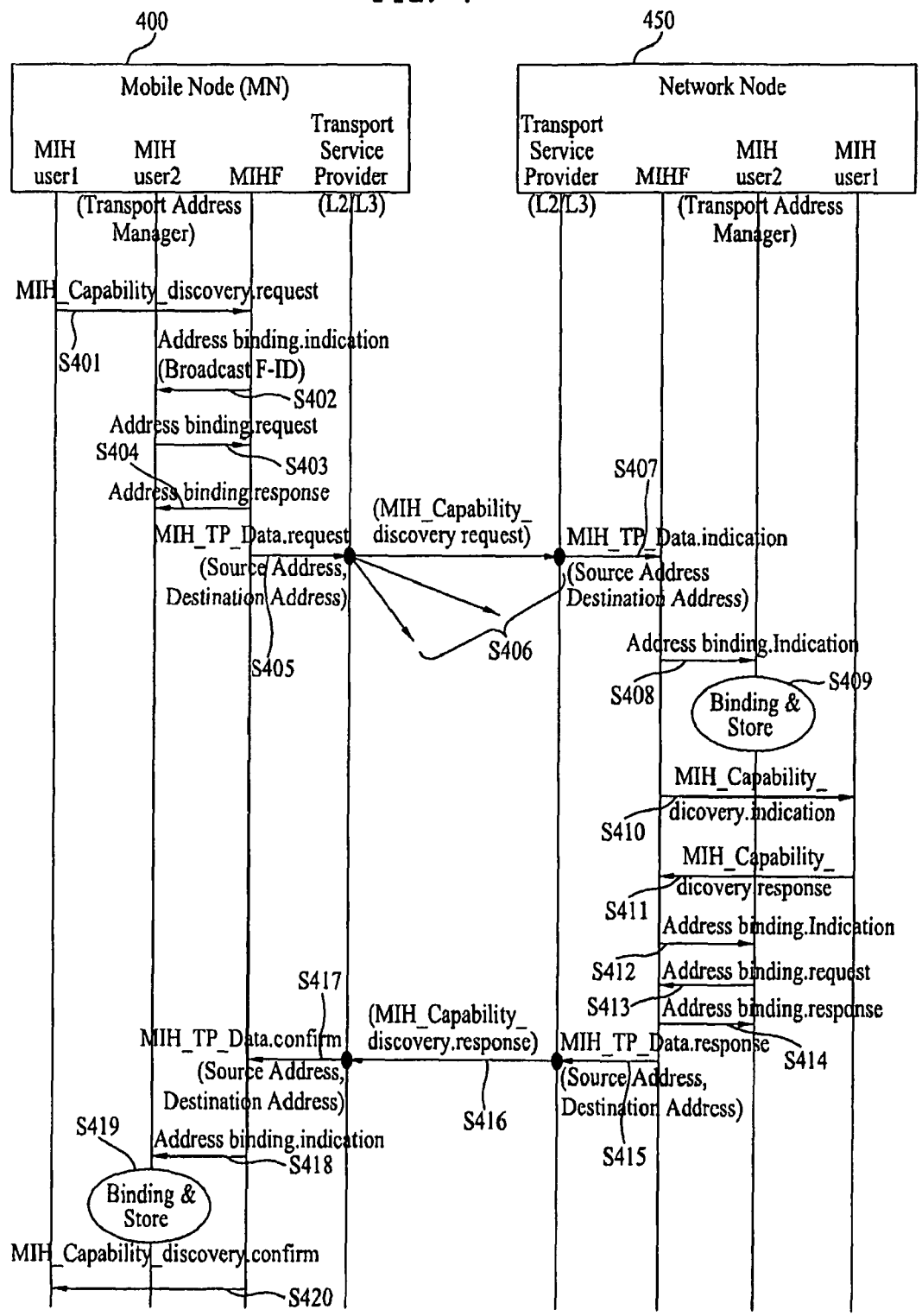
FIG. 4 is a diagram illustrating a method of performing MIHF ID discovery and MIH capability discovery procedures during handover by a mobile node, according to an exemplary embodiment of the present invention.

FIG. 4 is a diagram illustrating a method of performing MIHF ID discovery and MIH capability discovery procedures during MIH by a mobile node according to an exemplary embodiment of the present invention.

An MIHF ID discovery procedure is a procedure for obtaining information (for example, an MIHF ID) about a different MIHF entity supporting an MIHF. An MIH entity performs an MIH capability discovery procedure in order to determine services provided by MIH. That is, the MIH entity may perform the MIH capability discovery procedure in order to determine whether to perform a registration procedure in a different MIH entity. In this case, a mobile node (MN) can simultaneously perform the MIHF ID discovery and MIHF capability discovery by exchanging an MIH capability discovery message with another MIH entity.

Referring to FIG. 4, a mobile node 400 is a multi-node supporting one or more interface types. There are various types of interfaces as described above. The mobile node 400 may include a first entity (i.e., a first MIH user), a second entity (i.e., a second MIH user), an MIHF, and a transport service provider. The second entity may be a transport address manager.

A network node 450 may include a first entity (i.e., a first MIH user), a second entity (i.e., a second MIH user or a transport address manager), an MIHF, and a transport service provider.

The first entity of the mobile node transmits an MIH capability discovery request (MIH_Capability_discovery.request) primitive which is a local primitive to the MIHF which is a lower entity (step S401). The MIH capability discovery request primitive is generated when it is desired to discover the capability of a local or remote MIHF by the first entity of the mobile node. The first entity can selectively piggyback information about the capability of the local MIHF. Therefore, the local MIHF and remote MIHF can discover each other's capability through the primitive for capability discovery. Moreover, the mobile node can discover an MIHF ID of the counterpart network node using the MIH capability discovery request primitive.

The following Table 2 illustrates an example of the MIH capability discovery request primitive.

TABLE 2

| Syntax | Length | Description |
|---|---|---|
| MIH_Capability_discovery.request{ | | |
| Destination_Identifier | | ID of local MIHF or remote MIHF of destination |
| Supported_MIH_Event_List | | Event list supported by MIHF (Optional) |
| Supported_MIH_Command_List | | Command list supported by MIHF (optional) |
| Supported_IS_Query_Type_List | | Supported MIIS query type list (optional) |
| Supporter_Transport_List | | Supported transport type list (optional) |
| } | | |

The MIH capability discovery request primitive of Table 2 may include an event service information parameter Supported_MIH_Event_List provided by an MIHF of a mobile node 400 to discover capability between a remote MIHF and a local MIHF, that is, between the mobile node 400 and the network node 450, a command service information parameter Supported_MIH_Command_List provided by the MIHF, an information service information parameter Supported_Query_Type_List provided by the MIHF, and a supported transport type parameter Supported_Transport_List. However, since the mobile node can not know an MIHF ID of the network node, the MIHF ID of a destination included in the MIH capability discovery request primitive remains 'unknown' or includes a broadcast MIHF ID (for example, a zero-length string).

Steps S402 to S404 show a process of mapping the MIHF ID and the transport address.

Upon receiving the MIH capability discovery request primitive, the MIHF of the mobile node transmits an address binding indication (Address binding.indication) primitive to the second entity (or the transport address manager) which is one of upper layers to indicate a binding procedure of the transport address with an MIHF ID of the network node (step S402).

In step S402, the MIHF of the mobile node transmits the MIHF ID of a destination to the second entity. However, in other exemplary embodiments of the present invention, since the mobile node does not know a local MIHF ID or a remote MIHF ID of the destination, the MIHF of the mobile node transmits a broadcast MIHF ID to the second entity.

The following Table 3 illustrates an example of the address binding indication primitive.

TABLE 3

| Syntax | Length | Description |
| --- | --- | --- |
| Address binding.indication{ | | |
| Source Identifier | | Source MIHF ID |
| Transport_Type | | L2 or L3 |
| Transport_Address_List | | MIHF ID of destination (In this case, broadcast MIHF ID) and transport address list |
| } | | |

The address binding indication primitive of Table 3 includes a source ID parameter Source Identifier indicating an MIHF ID of the mobile node which is a source, a transport type parameter Transport_Type indicating whether data is to be transmitted through the second layer or the third layer, and a transport address list parameter Transport_Address_List including a transport address list.

The transmit address list parameter Transport_Address_List may include the MIHF ID of the destination received from the first entity. In other exemplary embodiments of the present invention, however, since the mobile node does not know the MIHF ID of the destination, a broadcast MIHF is included in the transport address list parameter. The broadcast MIHF ID may take the form of a zero-length string.

The second entity which has received the transport address list parameter transmits an address binding request (Address binding.request) primitive including a transport address corresponding to the MIHF ID received from the MIHF to the MIHF of the mobile node 400 (step S403). If there is no transport address corresponding to the MIHF ID, a result code indicating a failure code that there is no corresponding information or that an effective time of requested information has expired can be transmitted.

The following Table 4 illustrates an example of the address binding request primitive.

TABLE 4

| Syntax | Length | Description |
| --- | --- | --- |
| Address binding.request{ | | |
| Source Identifier | | |
| Transport_Type | | L2 or L3 |
| Transport_Address_List | | MIHF ID and transport address |
| Result_Code | | Success/Failure(for example, no corresponding information or time expired) |
| } | | |

The address binding request primitive of Table 4 includes a source ID parameter Source Identifier, a transport type parameter Transport_Type indicating whether data is to be transmitted through the second layer or the third layer, a transport address list parameter Transport_Address_List including a transport address of a destination etc., and a result code parameter Result_Code indicating success or failure. In other exemplary embodiments of the present invention, a transport address corresponding to a broadcast MIHF ID (or zero-length string) may be assigned in the transport address list parameter.

Upon receiving the address binding request primitive, the MIHF of the mobile node transmits an address binding response (Address binding.response) primitive to the second MIHF user (step S404).

The MIHF of the mobile node transmits an MIH protocol PDU to be transmitted to a remote MIHF entity to the transport service provider using an MIH TP data request (MIH_T-P_Data.request) primitive (step S405).

In step S405, the transport service provider can know information such as a source address and a destination address included in the received MIH TP data request primitive.

The following Table 5 illustrates an example of an MIH TP data request primitive format.

TABLE 5

| Syntax | Length | Description |
| --- | --- | --- |
| MIH_TP_Data.request{ | | |
| Transport_Type | | Specific transport type of a protocol layer |
| Source_Address | | Specific transport address of a protocol layer of an entity having a source MIHF |
| Destination_Address | | Specific transport address of a protocol layer of an entity having a destination MIHF |
| Reliable_Delivery_Flag | | Indicates whether data has been reliably transmitted and whether an error has occurred during transmission |
| MIH Protocol PDU | | MIH protocol PDU to be transmitted |
| } | | |

The MIH TP data request primitive of Table 5 includes a transport type parameter Transport_Type, a source address parameter Source_Address, a destination address parameter Destination_Address, a reliable delivery flag parameter Reliable_Delivery_Flag, and an MIH protocol PDU parameter MIH Protocol PDU. The transport type parameter indicates whether an MIH protocol message including an MIH PDU is to be transmitted through the second layer or the third layer. The source address parameter designates a transport address of the source, and a destination address parameter designates a transport address of the destination. Since the MIHF of the mobile node does not know the MIHF ID and transport address of the destination, a broadcast address corresponding to a broadcast MIHF ID is included in the destination address parameter.

The transport service provider of the mobile node transmits an MIH capability discovery request protocol message to adjacent network nodes through the second or third layer, according to the transport type included in the MIH TP data request primitive (step S406).

In step S406, a method of generating the MIH capability discovery request protocol message is as described in FIG. 2. Therefore, the mobile node which is a source generates the MIH capability discovery request message using the method described in FIG. 2 and transmits the MIH capability discovery request message to adjacent network nodes in the form of a broadcast.

If the mobile node does not know an MIHF ID of an MIHF entity of the destination, the mobile node adds a broadcast MIHF ID to an area including the MIHF ID of the destination. Moreover, the mobile node transmits the MIH capability discovery request message through a data plane of the second or third layer.

If the mobile node knows the MIHF ID of the MIHF entity of the destination, the mobile node may transmit the MIH capability discovery request message including the MIHF ID of the destination through the data plane of the second or third layer in the form of a unicast.

In step S406, the MIH capability discovery request message may include in an MIH header an MIH header field (SID=1, Opcode=1, AID=1), a source MIHF ID, and a destination MIHF ID. The message may also include parameters indicating MIH capability provided by the mobile node in an MIH payload area. That is, the message may include a parameter Supported_MIH_Event_List including information about an event service supported by the MIH, a parameter Supported_MIH_Command_List including information about a command service supported by the MIH, a parameter Supported_MIH_Query_Type_List including an information service supported by the MIH, and a parameter Supported_Transport_List indicating a transport type. Thus, the mobile node and the MIHF entity of the network node can discover each other's MIH capability by exchanging the MIH protocol message. The mobile node sets a timer at the time of sending the MIH_Capability_discovery request protocol message during which time the mobile node is in waiting state for a response from the unknown network node.

Referring back to FIG. 4, the transport service provider of the adjacent network node 450 which has received the MIH capability discovery request protocol message transmits an MIH TP data indication (MIH_TP_Data.indication) primitive to the MIHF to report that an MIH PDU has been transmitted (step S407).

The following Table 6 illustrates an example of the MIH TP data indication primitive.

TABLE 6

| Syntax | Length | Description |
| --- | --- | --- |
| MIH_TP_Data.indication{ | | |
| Transport_type | | Option ID of a specific transport of a protocol layer |
| Source_Address | | Specific transport address of a protocol layer having an entity having a source MIHF |
| Destination_Address | | Specific transport address of a protocol layer having an entity having a destination MIHF |
| Reliable_Delivery_Flag | | Indicates whether data has been reliably transmitted and whether an error has occurred during transmission |
| MIH Protocol PDU | | MIH protocol PDU |
| } | | |

The MIH TP data indication primitive of Table 6 includes a transport type parameter Transport_Type, a source address parameter Source_Address, a destination address parameter Destination_Address and a reliable delivery flag parameter Reliable_Delivery_Flag, and an MIH protocol PDU.

Upon receiving the MIH TP data indication primitive, the MIHF of the adjacent network node 450 transmits the address binding indication primitive to the second entity (or transport address manager) to direct the second entity to maintain the transport address of the mobile node for a prescribed time (step S408).

The second entity stores the transport address of the mobile node under a direction of the MIHF (step S409).

The MIHF of the network node 450 transmits an MIH capability discovery indication (MIH_Capability_discovery.indication) primitive to the first entity of the network node to report that the MIH capability discovery request message has been received (step S410).

The following Table 7 illustrates an example of the MIH capability discovery indication primitive.

TABLE 7

| Syntax | Length | Description |
| --- | --- | --- |
| MIH_Capability_discovery.indication{ | | |
| Source_Identifier | | MIHF ID of a source generating the primitive |
| Support_MIH_Event_List | | Event service list supported by MIHF (optional) |
| Support_MIH_Command_List | | Command service list supported by MIHF (optional) |
| Support_IS_Query_Type_list | | MIIS query type list supported by MIHF (optional) |
| Support_Transport_List | | Transport type list supported by MIHF (optional) |
| } | | |

The MIH capability discovery indication primitive of Table 7 includes a source ID parameter Source_Identifier indicating an MIHF ID of a source generating the MIH capability discovery indication primitive, and parameters Support_MIH_Event_List, Support_MIH_Command_List, Support_IS_Query_Type_List and Support_transport_List which indicate MIH service information. In this case, the MIH capability discovery indication primitive may selectively include the parameters indicating the MIH service information. If the parameters indicating the MIH service information are included in the MIH capability discovery indication primitive, the MIHF of the destination can obtain information about capability supported by the MIHF of the source.

As a response to step S410, the first entity transmits an MIH capability discovery response (MIH_Capability discovery.response) primitive to the MIHF (step S411).

However, since the MIHF can directly transmit a response message without generating the MIH capability discovery indication primitive, steps S410 and S411 are optional.

The MIH capability discovery response primitive is generated to transmit information about capability of the MIH supported by the MIH entity of the network node 450 to the MIHF. By receiving the primitive in step S411 by the MIHF of the network node, an MIH capability discovery response message can be transmitted to the MIHF of the mobile node which is the source.

The following Table 8 illustrates an example of the MIH capability discovery response primitive.

TABLE 8

| Syntax | Length | Description |
| --- | --- | --- |
| MIH_Capability_discovery.response{ | | |
| Destination_Identifier | | MIHF ID of destination |
| Supported_Links | | Supported network type list |
| Link_MACs | | Network type and MAC address |
| Supported_MIH_Event_List | | Event service list supported by MIHF |
| Supported_MIH_Command_List | | Command service list supported by MIHF |
| Supported_IS_Query_type_List | | Supported MIIS query type list (optional) |
| Supported_Transport_List | | Supported transport type list (optional) |
| MBB_Handover_Support | | Indicates whether MBB handover is supported |
| Status | | Operational status |
| } | | |

The MIH capability discovery response primitive of Table 8 includes a destination ID parameter Destination_Identifier indicating an ID of an MIHF entity of a destination, a link support parameter Supported_Links indicating a supported network type, a link MAC parameter Link_MACS including a network type and a MAC address, an MIH event list parameter Supported_MIH_Event_List including an event service list supported by a destination MIHF, an MIH command list parameter Supported_MIH_Command_List including a command service list supported by the destination MIHF, a make-before-break (MBB) handover support parameter MBB_Handover_Support indicating whether MBB handover is supported, and a status parameter Status indicating an operational status. The MIH capability discovery response primitive may selectively include an MIH information query type list parameter Supported_IS_Query_Type_List and a transport list parameter Supported_Transport_List.

The MIHF receiving the primitive in step S411 requests that the second entity transmit the MIHF ID and the transport address of the source using the address binding indication primitive (step S412).

The second entity informs the MIHF of the transport address of the mobile node stored in step S408 using the address binding request primitive (step S413).

The MIHF of the network node 450 transmits the address binding response (Address binding.response) primitive to the second entity (step S414).

Steps S412 to S414 show an address binding process for mapping the MIHF ID and the transport address.

The MIHF of the network node 450 transmits an MIH TP data response (MIH_TP_Data.response) primitive to the transport service provider included in the network node (step S415).

The following Table 9 illustrates an example of the MIH TP data response primitive.

TABLE 9

| Syntax | Length | Description |
| --- | --- | --- |
| MIH_TP_Data.response{ | | |
| Transport_type | | Option ID of a specific transport of a protocol layer |

TABLE 9-continued

| Syntax | Length | Description |
| --- | --- | --- |
| Source_Address | | Specific transport address of a protocol layer of an entity having a source MIHF |
| Destination_Address | | Specific transport address of a protocol layer of an entity having a destination MIHF |
| Reliable_Delivery_Flag | | Indicates whether data has been reliably transmitted and whether an error has occurred during transmission |
| MIH Protocol PDU | | MIH protocol PDU |
| } | | |

The MIH TP data response primitive of Table 9 includes a transport type parameter Transport_Type, a source address parameter Source_Address, a destination address parameter Destination_Address, a reliable delivery flag parameter Reliable_Delivery_Flag, and an MIH protocol PDU. The transport type parameter indicates whether an MIH PDU is to be transmitted through a second layer or a third layer. The source address parameter indicates a transport address of the network node 450 which is a source. The destination address parameter indicates a transport address of the mobile node 400 which is a destination. Since the MIHF of the network node knows the MIHF ID and transport address of the mobile node which is a destination, the transport address mapped to the MIHF ID of the mobile node may be included in the destination address parameter.

The transport service provider of the network node 450 may transmit an MIH capability discovery response protocol message to the mobile node 400 in the form of a unicast through the second or third layer. In this case, the network node transmits the MIH capability discovery response message through the second or third layer according to the transport type shown in Table 9 (step S416).

In step S416, only the network node supporting the MIHF can respond to an MIH capability discovery request message which is periodically broadcast without being requested. The MIH capability discovery request response message includes an MIH header field (SID=1, Opcode=2, AID=1) in an MIH header, an MIHF ID of the network node 450 as a source ID, and an MIHF ID of the mobile node 400 as a destination ID.

The MIH capability discovery response message includes, in a payload area, an MIH event list parameter Supported_MIH_Event_List indicating capability of MIH provided by the network node, an MIH command list parameter Supported_MIH_Command_List, and an information service query list parameter Supported_IS_Query_Type_List.

The MIH capability discovery response message may include a transport support list parameter Supported_Transport_List including a transport list provided by a network node, a link MAC parameter Link_MACs, an MBB handover support parameter MBB_Handover_Support indicating whether MBB handover is supported, and a status parameter Status indicating a transmission status.

The transport service provider of the mobile node which has received the MIH capability discovery response message transmits an MIH TP data confirmation (MIH_TP_Data.confirm) primitive to the MIHF of the mobile node (step S417).

In step S417, the MIH TP data confirmation primitive is a response to the MIH TP data request primitive and is used to confirm that transmission has been successfully performed. That is, the transport service provider can transmit the transport address and MIHF ID, included in the normally received MIH capability discovery response message, of the source network node to the MIHF of the mobile node.

The MIHF of the mobile node transmits the MIHF and transport address of the network node 450 to the second entity using the address binding indication (Address binding.indication) primitive (step S419). The second entity binds and maintains the MIHF ID and transport address of the network node (step S419).

The MIHF of the mobile node transmits an MIH capability discovery confirmation (MIH_Capability_discovery.confirm) primitive including the MIHF ID of the network node and MIH capability information provided by the network node to the first entity of the mobile node (step S420).

Thus, the mobile node and the network node can ensure a process of binding the MIHF ID and the transport address to transmit the MIH protocol message. Therefore, the mobile node or the network node can effectively reduce transmission defects while transmitting a unicast or broadcast protocol message.

FIG. 4 illustrates an exemplary embodiment of the present invention in the case where the mobile requests that an adjacent network node discover the MIHF ID and MIHF capability. The MIHF discovery procedure may be performed using an MIH protocol (for example, using an LLC of the second layer) or a medium specific broadcast message (for example, beacons in an IEEE 802.11 system, or DCD in an IEEE 802.16 system) in the second layer. The terms in FIG. 4 have been used to describe the exemplary embodiment of the present invention, however, it is apparent to those skilled in the art that modifications may be made without departing, the scope and spirit of the present invention.

Figure 5:
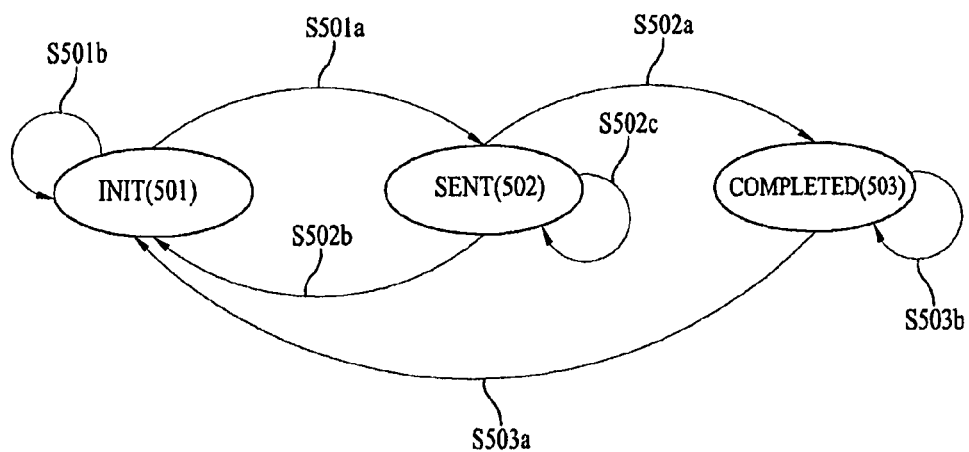
FIG. 5 is a state diagram illustrating an MIH capability discovery procedure performed by a source node according to an exemplary embodiment of the present invention.

FIG. 5 is a state diagram illustrating an MIH capability discovery procedure performed by a source node according to an exemplary embodiment of the present invention.

In the source node, an 'INIT' state 501 indicating an initial state transitions to a 'SENT' state 502 if a request (REQ) is transmitted in the form of a broadcast without acknowledgement request (ACK Req) (S501a). The source node can receive a plurality of response messages RSP in the 'INIT' state. At this time, the source node stores the received response messages and maintains a current state (S501b).

The source node sets a transaction timer at the time of sending an MIH_Capability_Discover request message for a response from a destination node.

Upon receiving an MIH response message in the 'SENT' state, the source node transitions to a 'COMPLETED' state 503 (S502a). If an ACK request occurs, the source node transmits an ACK signal, and if there is no ACK request, the source node does not take any action.

If no response message is received within a prescribed time in the 'SENT' state, the source node may again broadcast an MIH capability discovery request message by changing a transport type (S502c). That is, if a response message is not received even though a request message has been broadcast through a second layer, the source node may broadcast the request message through a third layer. It is apparent that the request message is first broadcast through the third layer and, if no response message is received, the request message may be broadcast through the second layer.

If a transaction time has expired in the 'SENT' state 502, the source node transitions to the 'INIT' state (S502b) and ends the MIH capability discovery procedure.

If the transaction time has expired in the 'COMPLETED' state 503, the source node transitions to the 'INIT' state (S503a). The source node may receive a plurality of MIH capability discovery response messages during a specific time. At this time, the source node stores the respective MIH capability discovery response messages. If the MIH capability discovery response message includes an ACK request, the source node transmits an ACK signal and maintains a current state (S503b). If the MIH response message includes a bit set requesting the ACK signal, the source node may act in conjunction with a destination node.

Figure 6:
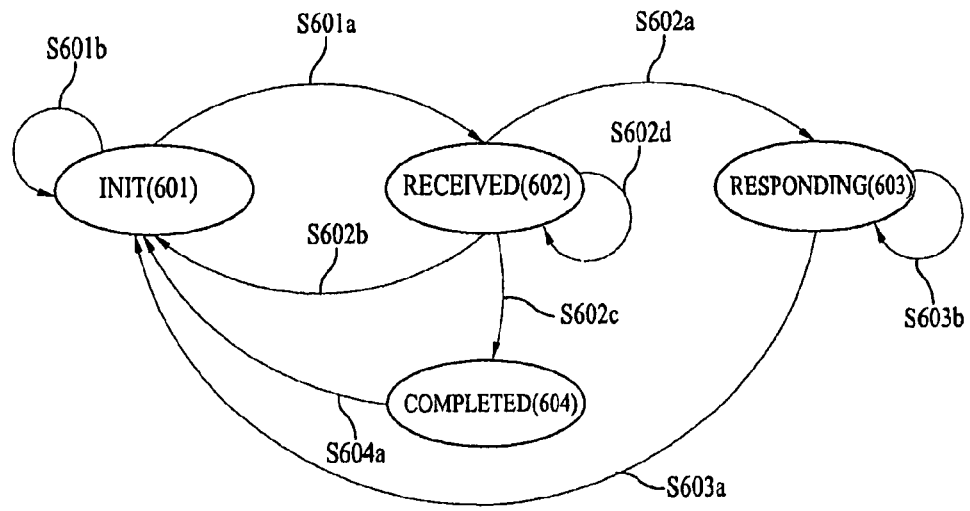
FIG. 6 is a state diagram illustrating an MIH capability discovery procedure performed by a destination node according to an exemplary embodiment of the present invention.

FIG. 6 is a state diagram illustrating an MIH capability discovery procedure performed by a destination node according to an exemplary embodiment of the present invention.

In an initial state, that is, an 'INIT' state 601, if it is difficult for a destination node to directly respond to an MIH capability discovery request message even though the MIH capability discovery request message has been received, the destination node transitions to a 'RECEIVED' state 602 (S601a). The destination node may broadcast a response message with a retransmission time in the 'INIT' state (S601b).

If the MIH request message includes an ACK-Req bit set and the destination node can directly respond, the destination node transitions to a 'RESPONDING' state 603 from the 'RECEIVED' state 602 and waits for an ACK signal, by transmitting the MIH response message including an ACK-Req bit (S602a).

If the destination node receives the ACK signal or a prescribed time elapses in the 'RESPONDING' state 603, the destination node transitions to the 'INIT' state 601 and re-establishes a transaction process (S603a). Moreover, if a prescribed time elapses in the 'RESPONDING' state 603, the destination node transmits the MIH response message and maintains the 'RESPONDING' state (S603b). The destination node may keep the 'RESPONDING' state until the ACK signal is received.

If the destination node does not transmit the MIH response message even though the MIH request message has been received, that is, if the transmission time is ended, the destination node retransmits the MIH response message (S602d). In an exemplary embodiment of the present invention, if the ACK signal is not received even though the MIH response message is transmitted through the second layer, the MIH response message may be retransmitted through the third layer by changing a transport type. It is apparent that if the ACK signal is not received even though the MIH response message is transmitted through the third layer, the MIH response message may be transmitted through the third second layer. If the transmission time is ended in the 'RECEIVED' state 602, the destination node transitions to the 'INIT' state 601 and re-establishes the transaction process (S602b).

If the MIH request message does not include the ACK-Req bit set and the destination node can transmit the MIH response message without the ACK-Req bit set in the 'RECEIVED' state 602, the destination node transmits the MIH response message and transitions to a 'COMPLETED' state 604 (step S602c).

If a prescribed time elapses in the 'COMPLETED' state, the destination node transitions to the 'INIT' state 601 and re-establishes the transaction process (step S604a).

Figure 7:
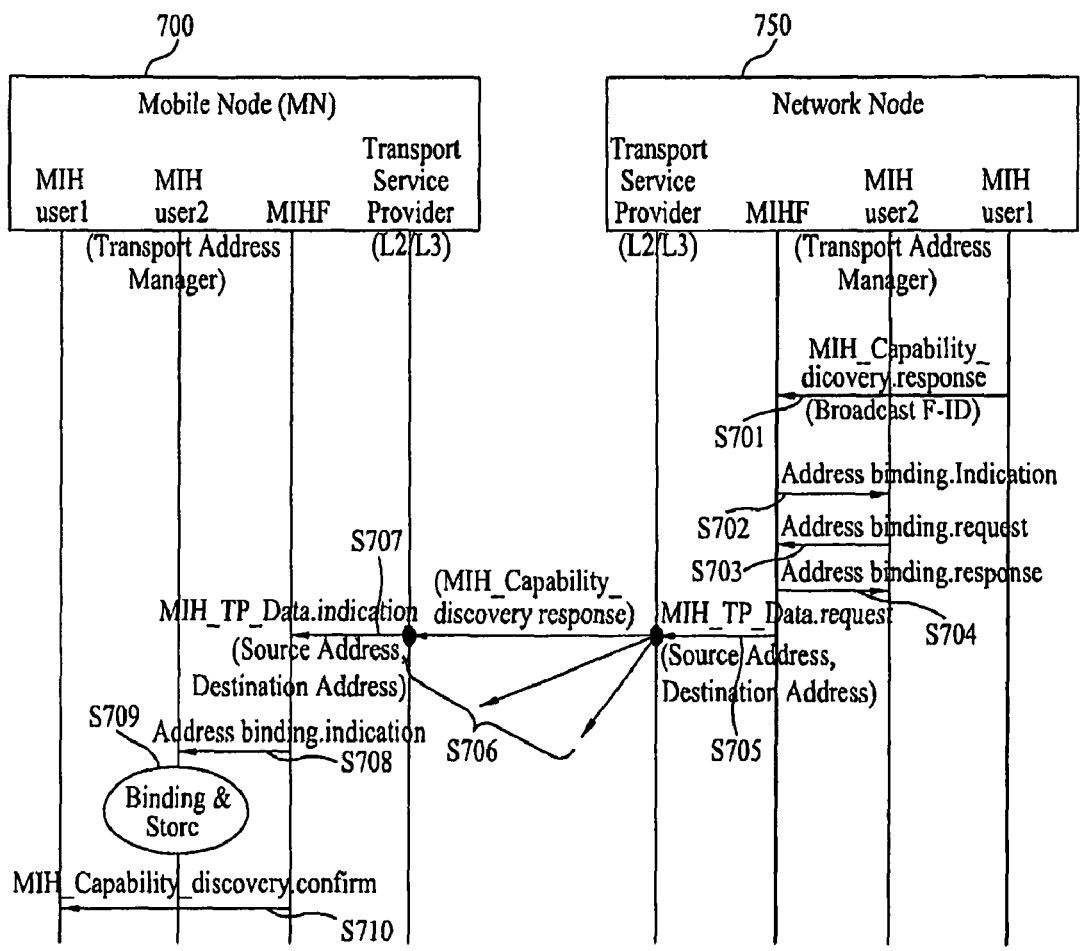
FIG. 7 is a diagram illustrating a method of transmitting an MIH capability response message by a network node to a mobile node without request by a mobile node, according to an exemplary embodiment of the present invention.

FIG. 7 is a diagram illustrating a method of transmitting an MIH capability response message by a network node to a mobile node without request by a mobile node, according to an exemplary embodiment of the present invention.

In FIG. 7, a mobile node (MN) 700 is a multi-node supporting one or more interface types. There are various types of interfaces as described above. The mobile node includes a first MIH user (i.e., a first entity), a second MIH user (i.e., a second entity or a transport address manager), an MIHF, and a transport service provider. A network node 750 includes a first MIH user (i.e., a first entity), a second MIH user (i.e., a second entity or a transport address manager), an MIHF, and a transport service provider.

An MIHF entity of the mobile node 700 can discover an MIHF ID and capability of an MIHF entity of the network node 750 by receiving a medium specific broadcast message or an MIH capability broadcast message. For example, a link layer of the mobile node can receive a message directing toward an MIHF of the mobile node 700 by listening to the medium specific broadcast message, such as a beacon in an IEEE 802.11 system or a dedicated channel descriptor (DCD) in an IEEE 802.16 system. The MIHF of the mobile node can receive through a data plane an MIH capability discovery request message which is periodically broadcast by the MIHF of the network node 750.

Referring to FIG. 7, the first MIH user in one network node 750 of adjacent network nodes of the mobile node 700 transmits an MIH capability discovery response primitive to an MIHF (step S701).

In step S701, the MIH capability discovery response primitive is generated to transmit information on capability of the MIH supported by the MIH entity of the network node 450 to the MIHF. The MIH capability discovery response primitive includes a parameter Destination_Identifier indicating an ID of a destination MIHF entity, a parameter Supported_Links indicating a supported network type, a parameter Link_MACs including a network type and a MAC address list, a parameter Supported_MIH_Event_List including an event service list supported by a destination MIHF, a parameter Supported_MIH_Command_List including a command service list supported by the destination MIHF, a parameter MBB_handover_Support indicating whether MBB handover is supported, and a status parameter Status indicating an operational status.

The MIH capability discovery response primitive may selectively include a parameter Supported_IS_Query_Type_List about a supportable information service and a parameter Supported_Transport_List about information of a supportable transport address.

In step S701, a broadcast MIHF ID is set in the parameter Destination_Identifier included in the capability discovery response primitive to direct the mobile node to perform an MIHF capability discovery procedure in the form of a broadcast. The broadcast MIHF ID may be expressed by a zero-length string.

The next process is similar to an operational process associated with MIH_NET_SAP in FIG. 4 and therefore a description will be given in brief. If forms of the primitives and messages used in FIG. 4 and FIG. 7 are the same, the primitives and messages may have the same format.

Steps S702 to 7404 show an address binding process for mapping an MIHF ID and a transport address.

The MIHF of the network node 750 receiving the MIH capability discovery response primitive transmits an address binding indication primitive to the second entity (or the transport address manager) which is one of upper layers to bind an MIHF ID and a transport address of the mobile node (step S702).

In step S702, the MIHF of the network node should acquire the transport address in order to transmit a protocol message to a destination indicated by the first entity. Therefore, the MIHF of the network node transmits the address binding indication primitive including the MIHF ID of a destination to the second entity (or the transport address manager) that manages the transport address. However, in other exemplary embodiments of the present invention, since the network node does not know a local MIHF ID or a remote MIHF ID of the destination (that is, the mobile node), the MIHF of the network node transmits a broadcast MIHF ID to the second entity. The broadcast MIHF ID may be represented in the form of a zero-length string.

The second entity transmits an address binding request (Address binding.request) primitive including the transport address corresponding to the MIHF ID received from the MIHF to the MIHF (step S703). The address binding request primitive may include a source ID parameter Source Identifier, a transport type parameter Transport_Type, a transport address list parameter Transport_Address_List, and a result code parameter Result_Code. In other exemplary embodiments of the present invention, a transport address corresponding to a broadcast MIHF ID (or a zero-length string) may be assigned to the transport address list parameter.

The MIHF receiving the address binding request primitive transmits an address binding response primitive to the second entity (step S704).

The MIHF of the network node requests that the transport service provider broadcast an MIH PDU to remote MIHF entities (that is, mobile nodes) by using an MIH TP data request (MIH_TP_Data.request) primitive (step S705).

In step S705, the MIH TP data request primitive may include a transport type parameter Transport_Type, a source address parameter Source_Address, a destination address parameter Destination_Address, a reliable delivery flag parameter Reliable_Delivery_Flag, and an MIH protocol PDU.

The transport type parameter indicates whether the MIH PDU is transmitted to the second layer or the third layer. The source address parameter indicates a transport address of a source (that is, the network node), and the destination address parameter indicates a transport address of a destination (that is, the mobile node). Since the MIHF of the network node does not know the MIHF ID and the transport address of the destination, a broadcast address corresponding to a broadcast MIHF ID is included in the destination address parameter in the form of a broadcast.

The transport service provider of the network node broadcasts an MIH capability discovery response protocol message to adjacent mobile nodes through the second or third layer (step S706).

The transport service provider of the mobile node 700 receiving the MIH capability discovery response message transmits an MIH TP data indication (MIH_TP_Data.indication) primitive to the MIHF of the mobile node in order to report that an MIH PDU of the network node is transmitted (step S707).

In step S707, the MIH TP data indication primitive may include a transport type parameter Transport_type, a source address parameter Source_Address indicating a transport of a source, a destination address parameter Destination_Address indicating a transport address of a destination, a reliable delivery flag parameter Reliable_Delivery_Flag, and an MIH protocol PDU.

The MIHF of an adjacent mobile node 700 receiving the MIH TP data indication primitive transmits an address binding indication primitive to the second entity (or transport address manager) to direct the second entity to maintain transport address information corresponding to the MIHF ID of the network node for a prescribed time (step S708).

The second entity of the mobile node stores the transport address information corresponding to the MIHF ID of the network node for a prescribed time under the direction of the MIHF (step S709).

The MIHF of the mobile node 700 adds an MIHF ID of the network node 750 and MIH capability information provided by the network node to an MIH capability discovery confirmation (MIH_Capability_discovery.confirm) primitive and transmits the MIH capability discovery conformation primitive to the first entity of the mobile node (step S710).

Thus, the network node and the mobile node can definitely perform a process for binding the MIHF ID and the transport address in order to transmit the MIH protocol message. Therefore, transmission defects can be effectively reduced when the mobile node or network node transmits a unicast or broadcast protocol message.

Figure 8:
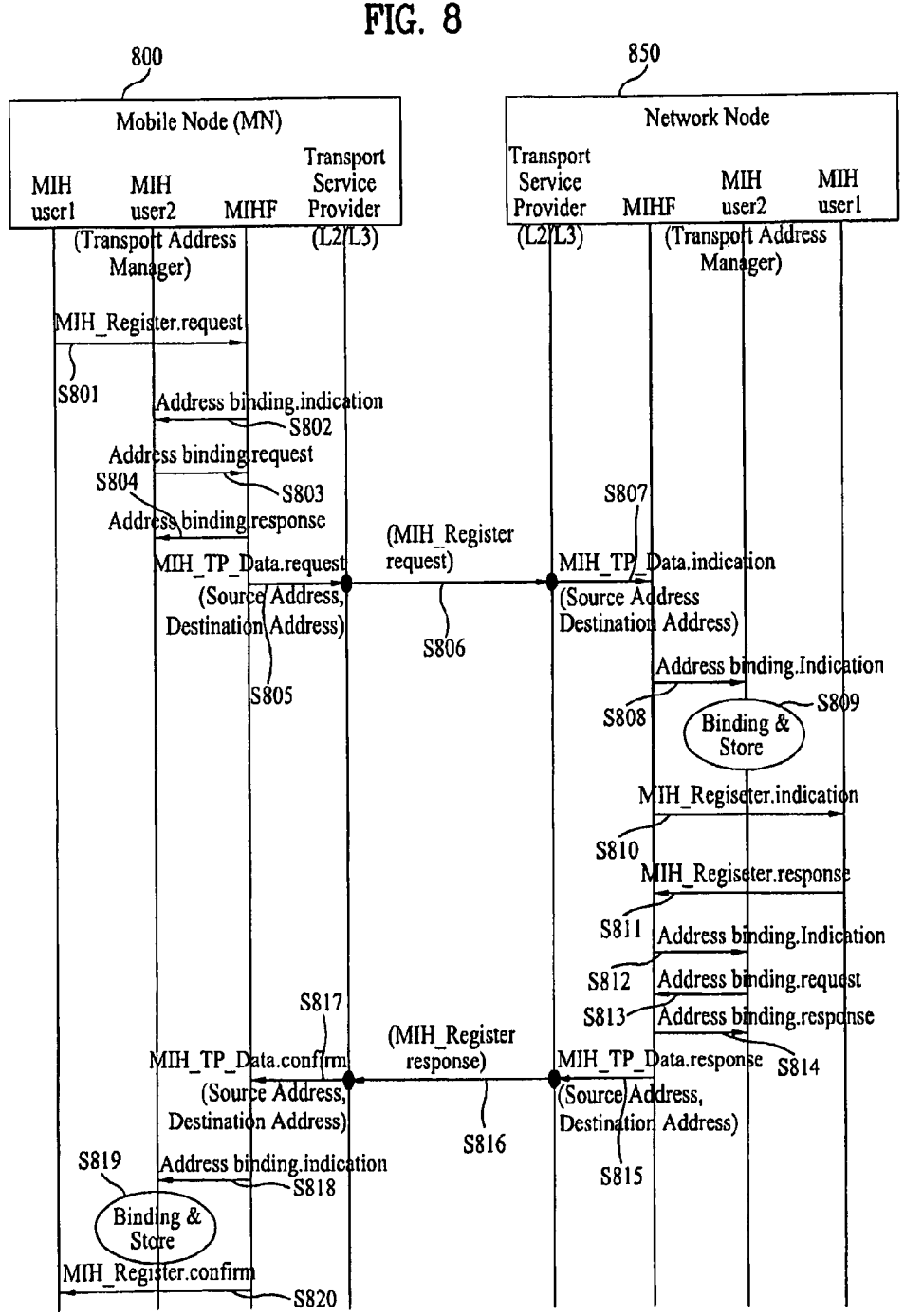
FIG. 8 is a diagram illustrating an MIH registration procedure between a mobile node and a network node according to an exemplary embodiment of the present invention.

FIG. 8 is a diagram illustrating an MIH registration procedure between a mobile node and a network node according to an exemplary embodiment of the present invention.

In FIG. 8, a mobile node 800 is a multi-node supporting one or more interface types. There are various types of interfaces as described above. The mobile node (MN) 800 includes a first MIH user (i.e., a first entity), a second MIH user (i.e., a second entity or a transport address manager), an MIHF, and a transport service provider. A network node 850 includes a first MIH user (i.e., a first entity), a second MIH user (i.e., a second entity or a transport address manager), an MIHF, and a transport service provider.

After the MIHF discovery procedure is performed, the mobile node 800 may perform a registration procedure with an MIHF of the network node 850. An MIHF of the mobile node and the MIHF of the network node can recognize each other and communicate with each other through the MIH registration procedure. The MIH registration procedure is a symmetric procedure. That is, if one of two MIHF entities starts the MIH registration procedure, the other one should respond thereto. Therefore, two MIH entities can symmetrically request a service. If the MIHF of the mobile node and the MIHF of the network node do not previously perform the registration procedure, the MIH network node can not provide any MIH service to the mobile node. However, in providing an MIH information service, the MIHF entity of the mobile node can access the MIH information service of an MIH entity of a network node which is not in an authentication state even if the MIH registration procedure is not performed.

Referring to FIG. 8, if the mobile node needs to perform a registration procedure with an MIHF of a remote network node, the first MIH user of the mobile node generates an MIH registration request (MIH_Register.request) primitive and transmits the MIH registration request primitive to the MIHF of the mobile node (step S801).

The following Table 10 illustrates an example of the MIH registration request primitive.

TABLE 10

| Syntax | Length | Description |
| --- | --- | --- |
| MIH_Register.request{ | | |
| Destination_Identifier | | MIHF ID of destination |
| Request_Code | | Registration request code |
| } | | |

The MIH registration request primitive of Table 10 includes a destination ID parameter Destination_Identifier and a request code parameter Request_Code. The destination ID parameter includes an MIHF ID of a destination. The request code parameter indicates a registration request code. The first entity can perform registration or release in conjunction with a remote or local MIHF entity according to the registration request code.

The MIHF entity of the mobile node 800 receiving the MIH registration request primitive performs an address binding procedure with the second entity (or the transport address manager) in order to acquire a transport address corresponding to the MIHF ID of the network node 850.

To perform the address binding procedure, the MIHF entity of the mobile node transmits an address binding indication (Address binding.indication) primitive to the second entity (or transport address manager) which is an upper layer (step S802).

In step S802, the MIHF of the mobile node 800 should obtain the transport address in order to transmit a protocol message of a destination directed by the first entity. Therefore, the MIHF of the mobile node transmits the address binding indication primitive including an MIHF ID of a destination to the second entity (or transport address manager) that manages the transport address.

In step S802, the address binding indication primitive includes a source ID parameter Source_Identifier, a transport type parameter Transport_Type indicating whether data is transmitted through a second layer or a third layer, and a transport address list parameter Transport_Address_List. The MIHF ID of the destination received from the first entity may be included in the transport address list parameter. The second entity of the mobile node recognizes the transport address corresponding to the MIHF ID of the destination because the MIHF ID discovery procedure and the MIHF capability discovery procedure have been already performed between the mobile node 800 and the network node 850. Therefore, the second entity of the mobile node can use the transport address.

The second entity receiving the address binding indication primitive transmits to the MIHF an address binding request (Address binding.request) primitive including the transport address corresponding to the MIHF ID received from the MIHF (step S803). The address binding request primitive may include a source ID parameter Source_Identifier, a transport type parameter Transport_type, a transport address list parameter Transport_Address_List, and a result code parameter Result_Code.

The MIHF receiving the address binding request primitive transmits an address binding response (Address binding.response) primitive to the second entity (step S804).

The MIHF of the mobile node requests that the transport service provider transmit an MIH PDU to a remote MIHF (that is, an MIHF of the network node) using an MIH TP data request (MIH_TP_Data.request) primitive (step S805).

The MIH TP data request primitive may include a transport type parameter, a source address parameter Source_Address, a destination address parameter Destination_Address, a reliable delivery flag parameter Reliable_Delivery_Flag, and an MIH protocol PDU. The transport type parameter indicates whether an MIH PDU is transmitted to a second layer L2 or a third layer L3. The source address parameter indicates a transport address of a source (i.e., a mobile node), and the destination address parameter indicates a transport address of a destination (i.e., a network node).

The transport service provider of the mobile node 800 transmits an MIH registration request (MIH_Register request) message, which is a protocol message, to the network node 850 in unicast form through the second layer L2 or the third layer L3 (step S806).

The MIH registration request message includes an MIH header area and a payload area. The MIH header may include an MIH header field (SID=1, Opcode=1, AID=2), a source ID, and a destination ID. The payload area may include a code (that is, registration request TLV code) requesting that the mobile node perform a registration procedure with the network node.

The transport service provider of the network node 850 receiving the MIH registration request message transmits an MIH TP data indication (MIH_TP_Data.indication) primitive to the MIHF in order to report that an MIH PDU has been transmitted (step S807). The above primitive is similar in format to the primitive shown in Table 4.

The MIH PT data indication primitive includes a transport type parameter, a source address parameter, a destination address parameter, a reliable delivery flag parameter, and an MIH protocol PDU. The MIHF of the network node 850 receiving the MIH TP data indication primitive transmits an address binding indication primitive to the second MIH user (or transport address manager) to direct the second MIH user to maintain the transport address of the mobile node for a prescribed time (step S808).

The second entity of the network node stores the transport address of the mobile node for a prescribed time under direction of the MIHF (step S809).

The MIHF of the network node 850 transmits an MIH registration indication (MIH_Register.indication) primitive to the first entity to report that the MIH registration request (MIH_Register request) message has been received (step S810).

The following Table 11 illustrates an example of the MIH registration indication primitive.

TABLE 11

| Syntax | Length | Description |
| --- | --- | --- |
| MIH_Register.indication{ | | |
| Source_Identifier | | MIHF ID of source |
| Request_Code | | Registration request code |
| } | | |

The MIH registration indication primitive of Table 11 includes a source ID parameter Source_Identifier, a request code parameter Request_Code, etc. The source ID parameter indicates an MIHF ID of a source. The first entity of the network node 850 may determine whether to perform registration or release with the MIHF entity of the mobile node according to contents included in the request code parameter.

The first entity of the network node 850 transmits an MIH registration response (MIH_Register.response) primitive to the MIHF as a response to step S810. The MIH registration response primitive is to report a result after a registration request procedure is finished and is generated by the first entity.

The following Table 12 illustrates an example of the MIH registration response primitive.

TABLE 12

| Syntax | Length | Description |
| --- | --- | --- |
| MIH_Register.response{ | | |
| Destination Identifier | | MIHF ID of mobile node |
| Valid_Time_Interval | | Time interval during which registration is valid. Applicable only when status parameter indicates success. '0' indicates validness. |
| Status | | Operational Status |
| } | | |

The MIH registration response primitive of Table 12 includes a destination ID parameter Destination Identifier indicating an MIHF ID of a mobile node, a valid time interval parameter Valid_Time_Interval indicating a time interval during which registration is valid, and a status parameter Status indicating whether an operation is success or failure. However, since the MIHF of the network node can directly transmit a response message without, generating the MIH registration indication primitive, steps S810 and S811 are optional.

Steps S812 to S820 are similar to steps S412 to S420 shown in FIG. 4 and will be understood by those skilled in the art even though there are slight differences. Therefore, a detailed description is omitted but different steps S816 and S820 will be described below in brief.

In step S816, the transport service provider of the network node 850 transmits an MIH registration response message to the mobile node 800 (step S816).

In step S816, an MIH registration response message includes an MIH header area and a payload area. The MIH header area may include an MIH header field (SID=1, Opcode=2, AID=2), a source ID, that is, an MIHF ID of the network node, and a destination ID, that is, an MIHF ID of a mobile node. The payload area may include the valid time interval parameter and the status parameter. In step S818, the MIHF of the mobile node may request that the second entity store transport address information corresponding to the MIHF ID during a valid time interval obtained in step S816 through an address binding indication (Address binding.indication) primitive.

In step S820, the MIHF entity of the mobile node informs the first entity, which is an upper layer, of a result of an MIH registration procedure using an MIH registration confirmation (MIH_Register.confirm) primitive. Therefore, the first entity of the mobile node can judge a result of a registration request.

The following Table 13 illustrates an example of the MIH registration confirmation primitive.

TABLE 13

| Syntax | Length | Description |
| --- | --- | --- |
| MIH_Register.confirm{ | | |
| Source_Identifier | | MIHF ID of network node |
| Valid_Time_Interval | | Time interval during which registration is valid. Applicable only when status parameter indicates success. '0' indicates validness. |
| Status | | Operational status |
| } | | |

The MIH registration confirmation primitive of Table 13 includes a source ID parameter indicating an MIHF ID of a network node, a valid time interval parameter indicating a time interval during which registration is valid, and a status parameter indicating an operational status.

Through registration procedure of FIG. 8, the MIHF entity of the mobile node and the MIHF entity of the network node can request and provide an MIH service. Unlike a general MIH registration procedure, a method of binding a known MIHF ID of a counterpart network node and a transport address of the counterpart network node is used so that the protocol message is transmitted without any defects.

Figure 9:
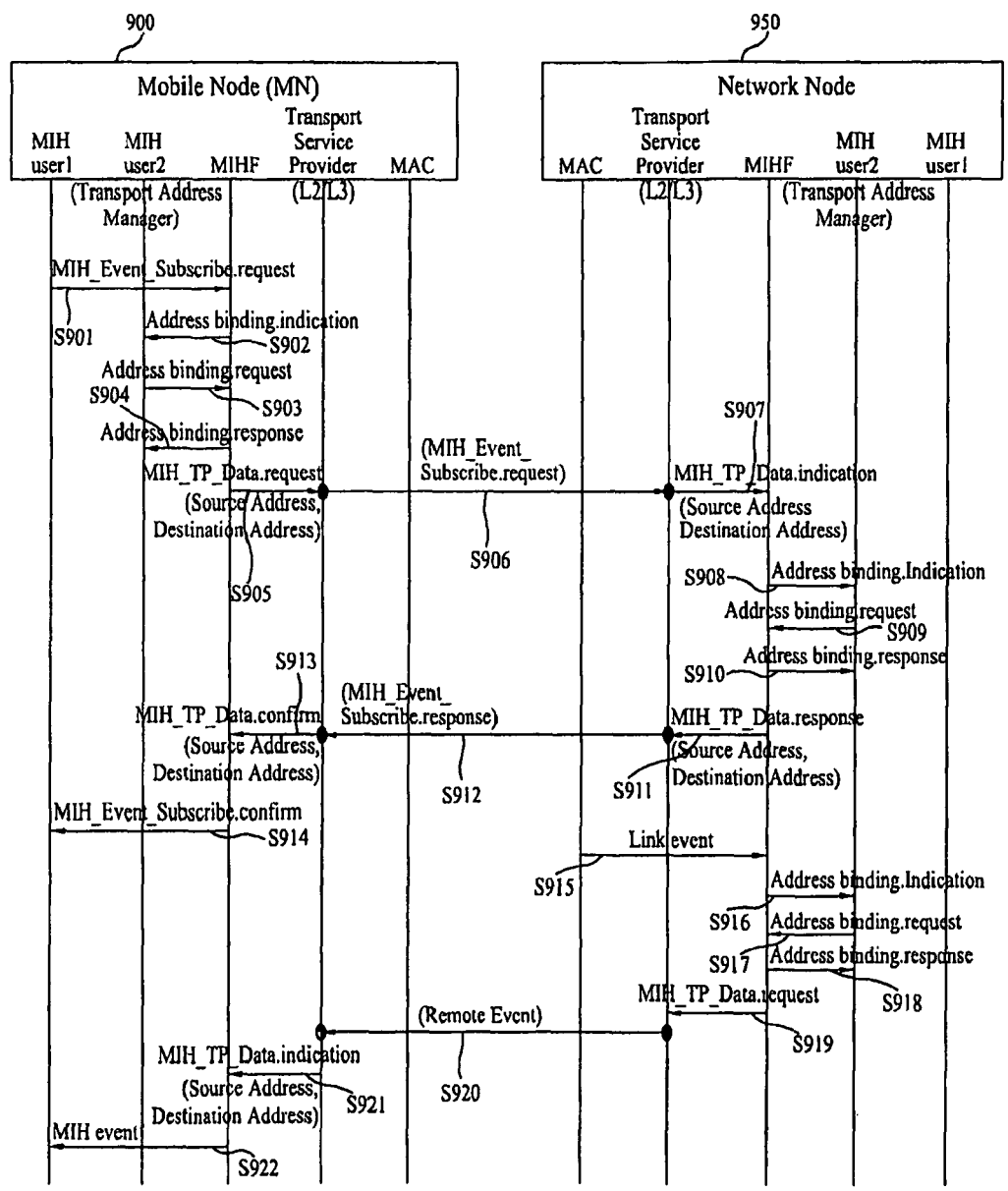
FIG. 9 is a diagram illustrating a process of transmitting an MIH event subscription request message and a response message according to an exemplary embodiment of the present invention.

FIG. 9 is a diagram illustrating a process of transmitting an MIH event subscription request message and a response message according to an exemplary embodiment of the present invention.

In FIG. 9, a mobile node 900 is a multi-node supporting one or more interface types. There are various types of interfaces as described above. The mobile node includes a first MIH user, a second MIH user (or a transport address manager), an MIHF, and a transport service provider. A network node 950 includes a first MIH user, a second MIH user (or a transport address manager), an MIHF, and a transport service provider.

It is assumed in FIG. 9 that the mobile node 900 has successfully performed MIHF ID discovery and MIHF capability discovery procedures and an MIH registration procedure with the adjacent network node 950. The next method of requesting an event service is described.

In FIG. 9, an MIH event subscription request and an event service are described. MIH event subscription provides mechanism to an upper layer from an MIHF so that events can be selectively requested. That is, the MIH event subscription is for an MIH user to receive a specific event set generated from a local or equal MIHF entity. The MIH user can specify a list of events to be received from the MIHF. An MIH event may include a local event or a remote event. The MIH user may specify additional parameters for controlling an operation of an event service during an event subscription procedure.

Referring to FIG. 9, the first MIH user of the mobile node 900 transmits an MIH event subscription request (MIH_Event_Subscribe.request) primitive to a local MIHF entity to direct the local MIHF entity or an MIHF entity of the network node 950 to subscribe a desired MIH event (step S901).

The following Table 14 illustrates an example of the MIH event subscription request primitive.

TABLE 14

| Syntax | Length | Description |
| --- | --- | --- |
| MIH_Event_Subscribe.request{ | | |
|   Destination_Identifier | | Local MIHF ID or remote MIHF ID |
|   Link_Identifier | | Link ID for event subscription request |
|   Requested_MIH_Event_List | | MIH event list |
| } | | |

The MIH event subscription request primitive of Table includes a destination ID parameter Destination_Identifier including a local MIHF ID or a remote MIHF ID, a link ID parameter Link_Identifier including a link ID for event subscription request, and a requested MIH event list parameter Requested_MIH_Event_List including an event list requested by an MIH user.

In step S901, if a local MIHF entity desires to receive an MIH event service, an MIHF entity of the mobile node can respond by generating an MIH event subscription confirmation (MIH_Event_Subscribe.confirm) primitive. If a remote MIHF entity desires to receive the MIH event service, the mobile node transmits an MIH event subscription protocol message to the MIHF entity of the network node and waits for a response. In another exemplary embodiment of the present invention, since the event service is received from the remote MIHF entity, a procedure will be described in detail.

Steps S902 to S914 in FIG. 9 are similar to steps S402 to S420 in FIG. 4 and to steps S802 to S819 in FIG. 8. Therefore, repetitive parts are described in brief.

Upon receiving the MIH event subscription request primitive, the MIHF entity of the mobile node performs an address binding process with a second entity (or transport address manager) which is an upper entity (steps S902 to S904). Through the address binding process, the MIHF entity of the mobile node can map a transport address and an MIHF ID of a remote network node 950.

The MIHF entity of the mobile node transmits an MIH TP data request (MIH_TP_Data.request) primitive to the transport service provider (step S905). The transport service provider can recognize the MIHF ID of the remote network node, which is a destination, through information included in the MIH TP data request primitive. Therefore, the transport service provider transmits an MIH event subscription request protocol message to the remote network node 950 (step S906). In this case, since the mobile node knows the MIHF ID and transport address of the network node, which is a destination, the MIH event subscription request protocol message can be transmitted in unicast form.

After receiving the MIH event subscription request protocol message, the transport service provider of the remote network node informs the MIHF of the network node that an MIH PDU is received using an MIH TP data indication (MIH_TP_Data.Indication) primitive (step S907). Steps 908 to S910 may be selectively performed when an MIH event subscription indication/response process is carried out.

The MIHF of the network node performs the address binding process with the first entity, which is an upper entity, thereby mapping the MIHF ID of the mobile node, which is a source, and MIH events which desire to receive subscription request. Moreover, the MIHF of the network node acquires the MIHF ID and the mapped transport address of the mobile node in order to send an MIH event subscription response message (steps S908 to S910).

The MIHF of the network node adds the mapped transport address to an MIH TP data response (MIH_TP_Data.response) primitive and then transmits the primitive to the transport service provider (step S911).

The transport service provider generates an MIH event subscription response (MIH_Event_subscribe response) protocol message and transmits the protocol message to the transport service provider of the mobile node (step S912). At this time, since the network node knows the MIHF ID and the transport address of the mobile node, the transport service provider of the network node can transmit the MIH event subscription response protocol message in unicast form.

The transport service provider of the mobile node transmits an MIH TP data confirmation (MIH_TP_Data.confirm) primitive to the MIHF of the mobile node to report that an MIH PDU is received (step S913). The MIHF of the mobile node transmits an MIH event subscription confirmation (MIH_Event_Subscribe.confirm) primitive to the first entity to report a result of MIH event subscription (step S914). However, this is effective when the MIH event subscription is successful. If the MIH event subscription fails, the MIH event subscription confirmation primitive is disregarded and an error control procedure may be performed.

Through steps S901 to S914, the mobile node and the network node complete an MIH event subscription request procedure. Next, if a remotely subscribed link event occurs, a MAC layer of the network node transmits the link event to the MIHF entity of the network (step S915).

The MIHF entity of the network node acquires an MIHF ID of an MIHF entity which subscribes the link event. Moreover, an address binding process is performed in order to acquire a subscribed event and a mapped transport address corresponding to an MIHF ID which subscribes the event (steps S916 to S918).

Since the address binding process used in FIG. 9 is similar to the address binding processes performed in FIGS. 4, 7, and 8, a detailed description thereof is omitted.

The MIHF entity of the network node transmits an MIH TP data request (MIH_TP_Data.request) primitive to the transport service provider (step S919). The transport service provider transmits a remote MIH event to the mobile node using information included in the MIH TP data request primitive (step S920). The transport service provider of the mobile node transmits a remote MIH event service to the MIHF entity of the mobile node using an MIH TP data indication primitive (step S921). The MIHF entity of the mobile node transmits an MIH event to the first entity which is an upper entity (step S922).

In FIG. 9, a method of providing a remote event service between the mobile node and the remote network node has been described. According to other exemplary embodiments of the present invention, in a method of subscribing an event and providing an event service, an ID and the transport address of an MIHF entity are bound, and the MIHF entity and provided events are bound, unlike a general method, so that a protocol message and an event service are provided without any defects.

Figure 10:
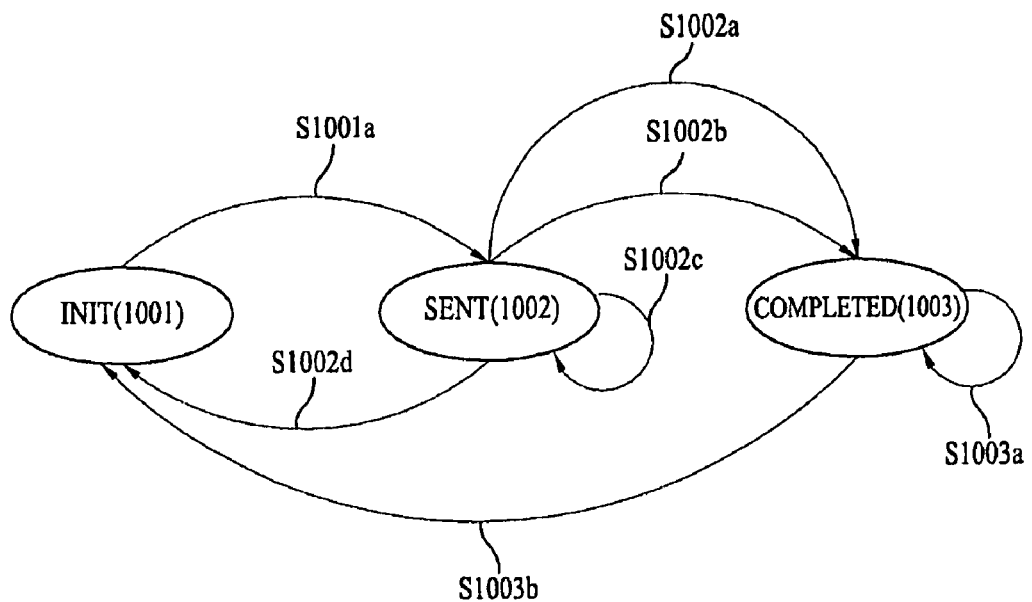
FIG. 10 is a state diagram illustrating an MIH capability discovery procedure performed by a source node according to another exemplary embodiment of the present invention.

FIG. 10 is a state diagram illustrating an MIH capability discovery procedure performed by a source node according to another exemplary embodiment of the present invention.

Referring to FIG. 10, a source node broadcasts an MIH capability discovery protocol message which does not set an ACK-Req bit in an 'INIT' state 1001 and transitions to a 'SENT' state 1002. At this time, the source node sets a 'T_transaction ID' timer at the time of sending the MIH capability discovery protocol message. Moreover, a 'T_noresponse' timer for the case where a response (RESPONSE) to a broadcast request (broadcast REQ) is not received is driven (S1001a).

In the 'SENT' state 1002, if the source node receives a unicast response message in which an ACK-Req bit is set is received, the source node stops the 'T-noresponse' timer and transmits an ACK signal. The source node transitions to a 'COMPLETED' state 1003 (S1002a).

In the 'SENT' state 1002, if the source node receives a unicast response message in which the ACK-Req bit is not set is received, the source node immediately stops the 'T-noresponse' timer and transitions to the 'COMPLETED' state 1003 (S1002b).

In the 'SENT' state 1002, if the source node does not receive at least one response within a time interval of the 'T_noresponse' timer even though the source node broadcasts a broadcast request, the source node retransmits the broadcast request using another transport type (for example, L2 or L3) and restarts the 'T_noresponse' timer (S1002c).

In the 'SENT' state 1002, if a time interval of the 'T-transaction ID' timer expires, the source node stops the 'T-noresponse' timer and transitions to the 'INIT' state 1001 (S1002d).

In the 'COMPLETED' state 1003, the source node receives a unicast response message in which an ACK-Req is set, the source node transmits an ACK signal (S1003a). If a time interval of the 'T-Transaction ID' timer expires, the source node transitions to the 'INIT' state and resets a capability discovery procedure (S1003b).

Figure 11:
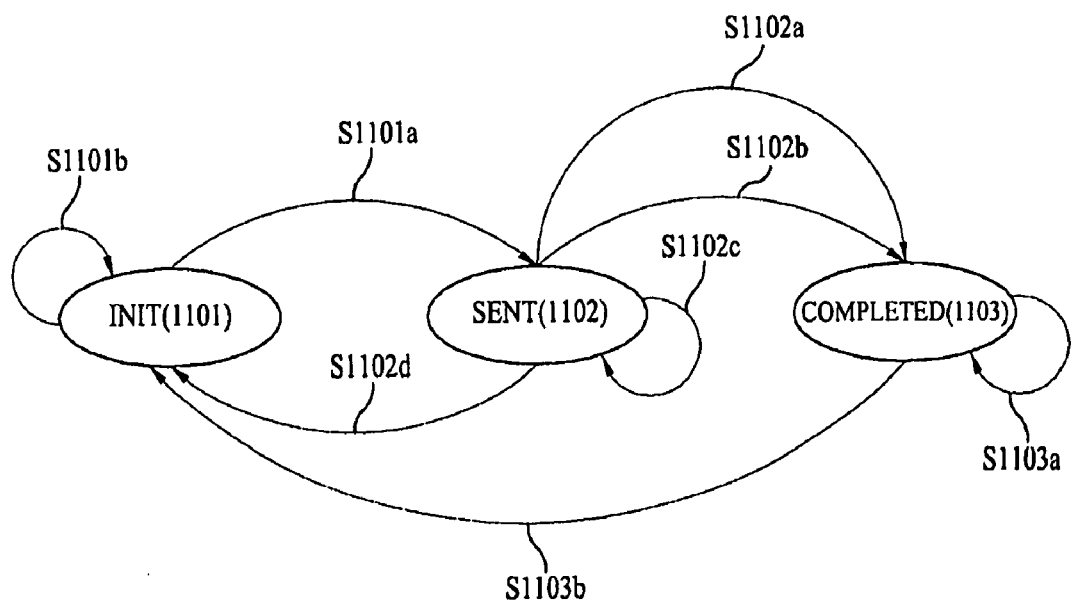
FIG. 11 is a state diagram illustrating an MIH capability discovery procedure performed by a source node according to still another exemplary embodiment of the present invention.

FIG. 11 is a state diagram illustrating an MIH capability discovery procedure performed by a source node according to still another exemplary embodiment of the present invention.

The configuration of FIG. 11 is substantially the same as the configuration of FIG. 10 except the 'INIT' state. A description of the 'INIT' state 1101 will be given.

Referring to FIG. 11, the source node can periodically receive a broadcast response (RESPONSE) message even though an MIH capability discovery request is not made. In this case, the source node maintains the 'INIT' state 1101 even after the response message is received (S1101b).

In S1101b, an ACK-Req bit is not set in the response message received when the source node does not make the MIH capability discovery request. Therefore, the source node does not need to transmit an ACK signal. A description of the other parts is the same as that of FIG. 10.

Figure 12:
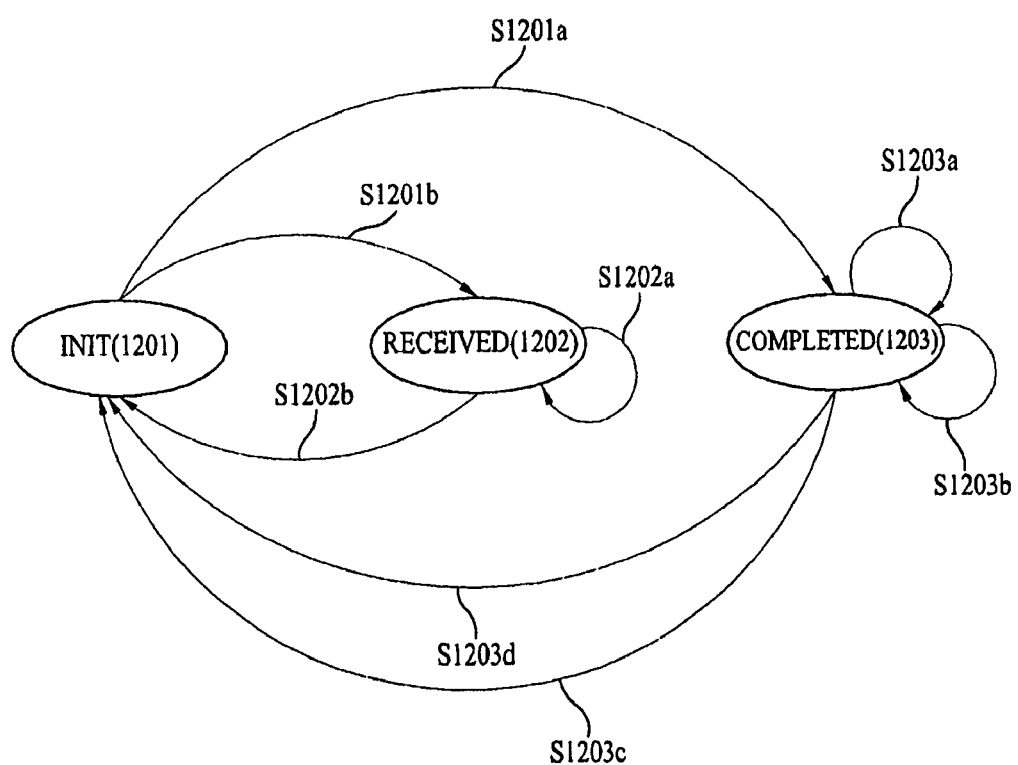
FIG. 12 is a state diagram illustrating an MIH capability discovery procedure performed by a destination node according to another exemplary embodiment of the present invention.

FIG. 12 is a state diagram illustrating an MIH capability discovery procedure performed by a destination node according to another exemplary embodiment of the present invention.

Referring to FIG. 12, the destination node receives a broadcast request (Broadcast REQUEST) message (for example, an MIH capability discovery request message) in an 'INIT' state 1201, the destination node transmits a unicast response message (for example, an MIH capability discovery response message) and drives a 'T-transaction ID' timer. The destination node may set an ACK-Req bit in the unicast response message. The destination node drives a 'T_Ack' timer and transitions to a 'COMPLETED' state 1203 (S1201a).

If the destination node does not set the ACK-Req bit in the unicast response message, the destination node transitions to a 'RECEIVED' state 1202 (S1201b).

In the 'RECEIVED' state 1202, if the destination node re-receives the broadcast request message after transmitting the response message, the destination node may continue to maintain the 'RECEIVED' state 1202. However, the response message has already been transmitted, the destination node does not retransmit the response message (S1202a).

If a timer interval of the 'T_transaction ID' timer expires in the 'RECEIVED' state 1202, the destination node transitions to the 'INIT' state and resets the MIH capability discovery procedure (S1202b).

Referring to FIG. 12, if the destination node does not receive an ACK signal in the 'COMPLETED' state 1203, the destination node retransmits the response message and waits for the ACK signal, thereby maintaining a current state while continuing to wait for the ACK signal (S1203a).

Even though the destination node re-receives the broadcast request message after transmitting the response message in the 'COMPLETED' state 1203 and before receiving the ACK signal, the destination node does not retransmit the response message to the broadcast request message and maintains the 'COMPLETED' state (S1203b).

In the 'COMPLETED' state 1203, if the ACK signal is received, the destination node stops the 'T-AcK' timer and the 'T-transaction' timer and transitions to the 'INIT' state 1201 (S1203c). Moreover, a timer interval of the 'T_transaction' timer expires irrespective of receiving the ACK signal, the destination node stops the 'T_Ack' timer and transitions to the 'INIT' state (S1203d).

Figure 13:
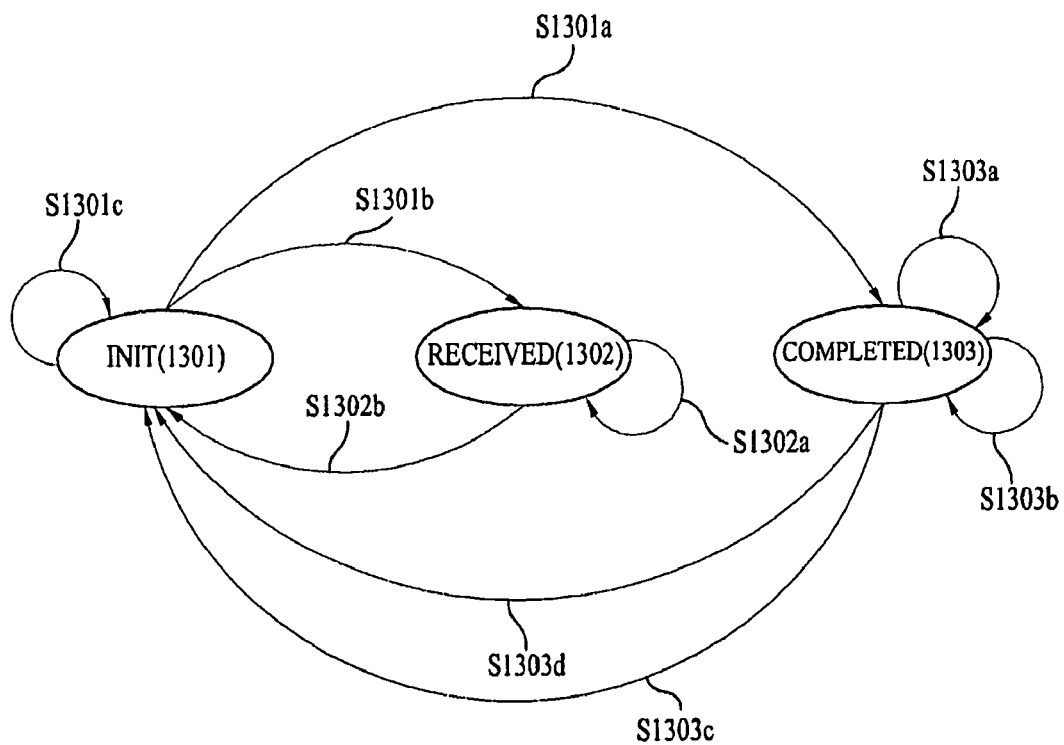
FIG. 13 is a state diagram illustrating an MIH capability discovery procedure performed by a destination node according to still another exemplary embodiment of the present invention.

FIG. 13 is a state diagram illustrating an MIH capability discovery procedure performed by a destination node according to still another exemplary embodiment of the present invention.

The configuration of FIG. 13 is substantially the same as the configuration of FIG. 12 except the 'INIT' state. A description of an 'INIT' state 1301 will be given.

Referring to FIG. 13, the destination node can periodically receive a broadcast response message even though an MIH capability discovery request message is not received (S1301c).

The destination node does not set an ACK bit when broadcasting an unsolicited broadcast response message. Therefore, the destination node does not need to wait for the ACK signal.

A description of the other parts is the same as that of FIG. 12.

Figure 14:
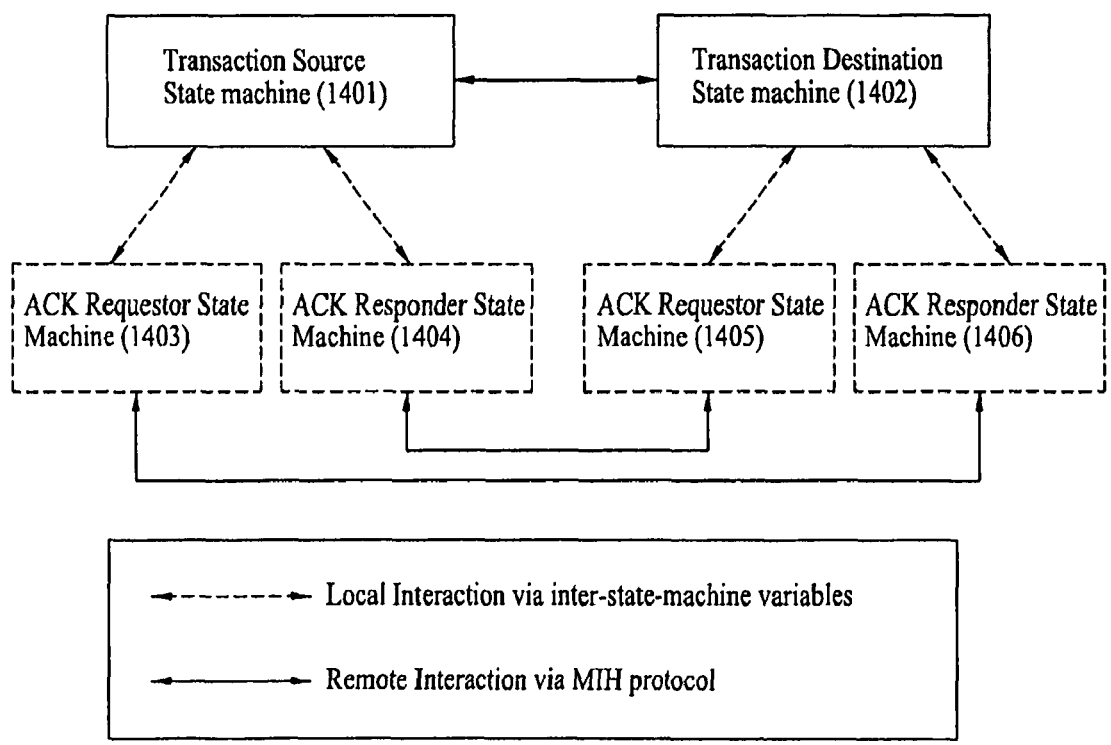
FIG. 14 is a conceptual diagram of an MIH state machine for transmitting an MIH protocol message according to an exemplary embodiment of the present invention.

FIG. 14 is a conceptual diagram of an MIH state machine for transmitting an MIH protocol message according to an exemplary embodiment of the present invention.

Referring to FIG. 14, a transaction source state machine 1401 is a node performing a function of generating and transmitting a new message in association with a new transaction process. Similarly, a node which receives the new message in association with the new transaction process is referred to as a transaction destination state machine 1402.

The transaction source state machine 1401 can remotely interact with the transaction destination state machine 1402 using an MIH protocol message. The transaction source state machine 1401 includes an ACK requestor state machine 1403 and an ACK responder state machine 1404 and can interact with the ACK requestor state machine 1403 and the ACK responder state machine 1404 using inter-state-machine variables. The transaction destination state machine 1402 includes an ACK requestor state machine 1405 and an ACK responder state machine 1406 and can communicate with the ACK requestor state machine 1405 and the ACK responder state machine 1406 using inter-state-machine variables.

The following Table 15 illustrates global variables showing exemplary embodiments of the present invention.

TABLE 15

| Name | Type | Description |
| --- | --- | --- |
| Opcode | OPCODE | Operation code |
| TID | TID | Transaction ID |
| MID | MID | Message ID |
| StartACKRequestor | BOOLEAN | If true value, Ack requestor state machine is started. |
| StartACKResponder | BOOLEAN | If true value, Ack responder state machine is started. |
| AckFailure | BOOLEAN | Failure of Ack operation |
| TransactionStopWhen | UNSINGED_INT(1) | Timer for stopping transaction |
| RetranmissionWhen | UNSINGED_INT(1) | Timer for retransmitting message |
| DelayedAckWhen | UNSINGED_INT(1) | Timer for transmitting delayed Ack message |

In Table 15, there are shown global variables used in the exemplary embodiments of the present invention. The global variable includes an operation code Opcode indicating transaction of an operation, a transaction ID TID indicating a transaction process, a message ID MID indicating a protocol message, a variable StartACKRequestor indicating start of an ACK requestor state machine, and a variable StartACKResponder indicating start of an ACK responder state machine. The global variable also includes a variable Ackfailure indicating failure of an ACK operation, a timer variable TransactionStopWhen for stopping transaction, a timer variable RetransmissionWhen for retransmitting a message, and a timer variable DelayedAckWhen for transmitting a delayed ACK message.

The following Table 16 illustrates exported variables used in the exemplary embodiments of the present invention.

TABLE 16

| Name | Type | Description |
| --- | --- | --- |
| Initialize | BOOLEAN | start of transaction |
| MsgIn | MIH_MESSAGE | Arrived message (incoming message) transmitted from remote MIHF to internal MIHF |

TABLE 16-continued

| Name | Type | Description |
| --- | --- | --- |
| MsgInAvail | BOOLEAN | Indicates whether incoming message |
| MsgOut | MIH_MESSAGE | Outgoing message generated by internal MIHF and transmitted to remote MIHF |
| MsgOutAvail | BOOLEAN | Indicates whether outgoing message |
| TransactionStatus | ENUMERATED | Transaction status 1: ongoing 2: success 3: failure |

In the variables of Table 16, a variable Initialize indicates start of transaction, and a variable MsgIn indicates an incoming message, that is, a protocol message transmitted to an internal MIHF entity from a remote MIHF entity. A variable MsgInAvail indicates whether there is an incoming message, and a variable MsgOut indicates a protocol message generated by an internal MIHF entity and transmitted to a remote MIHF entity. A variable MsgOutAvail indicates whether there is an outgoing message, and a variable TransactionStatus indicates a transaction status which may represent an ongoing, success or failure state.

Exemplary embodiments of the present invention are described with reference to Tables 15 and 16 and the accompanying drawings.

Figure 15:
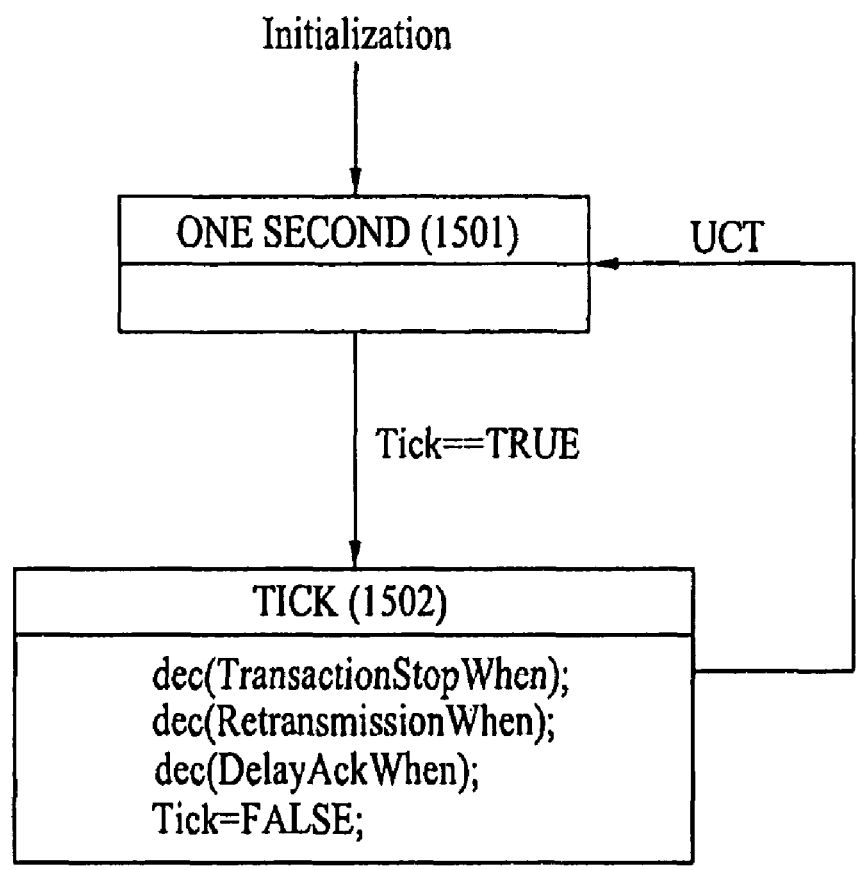
FIG. 15 is one example of a state machine of a transaction timer which may be used in other exemplary embodiments of the present invention.

FIG. 15 is one example of a state machine of a transaction timer which may be used in other exemplary embodiments of the present invention.

A state machine of a transaction timer decreases a timer value according to a clock function of an external system for each transaction. That is, if the timer value for the state machine is not 0, the timer value is decreased by an operation of the transaction timer.

Referring to FIG. 15, if a tick is true in a 'ONE SECOND' state 1501, the 'ONE SECOND' state 1501 proceeds to a 'TICK' state 1502. A tick variable is set correspondingly to a one second tick generated by a clock function of a normal external system. The tick value is set to true whenever a clock of a system generates a one second tick. In FIG. 15, a variable 'dec' is decreased only when the timer value is lager than 0. The 'TICK' state 1502 unconditionally goes to the 'ONE SECOND' state 1501. Referring to FIG. 15, the Transaction Timers state machine for a given transaction is responsible for decrementing the timer variables for this transaction each second, in response to an external system clock function. The timer variables are used, and set to their initial values, by the operation of the individual state machines for the transaction.

Figure 16:
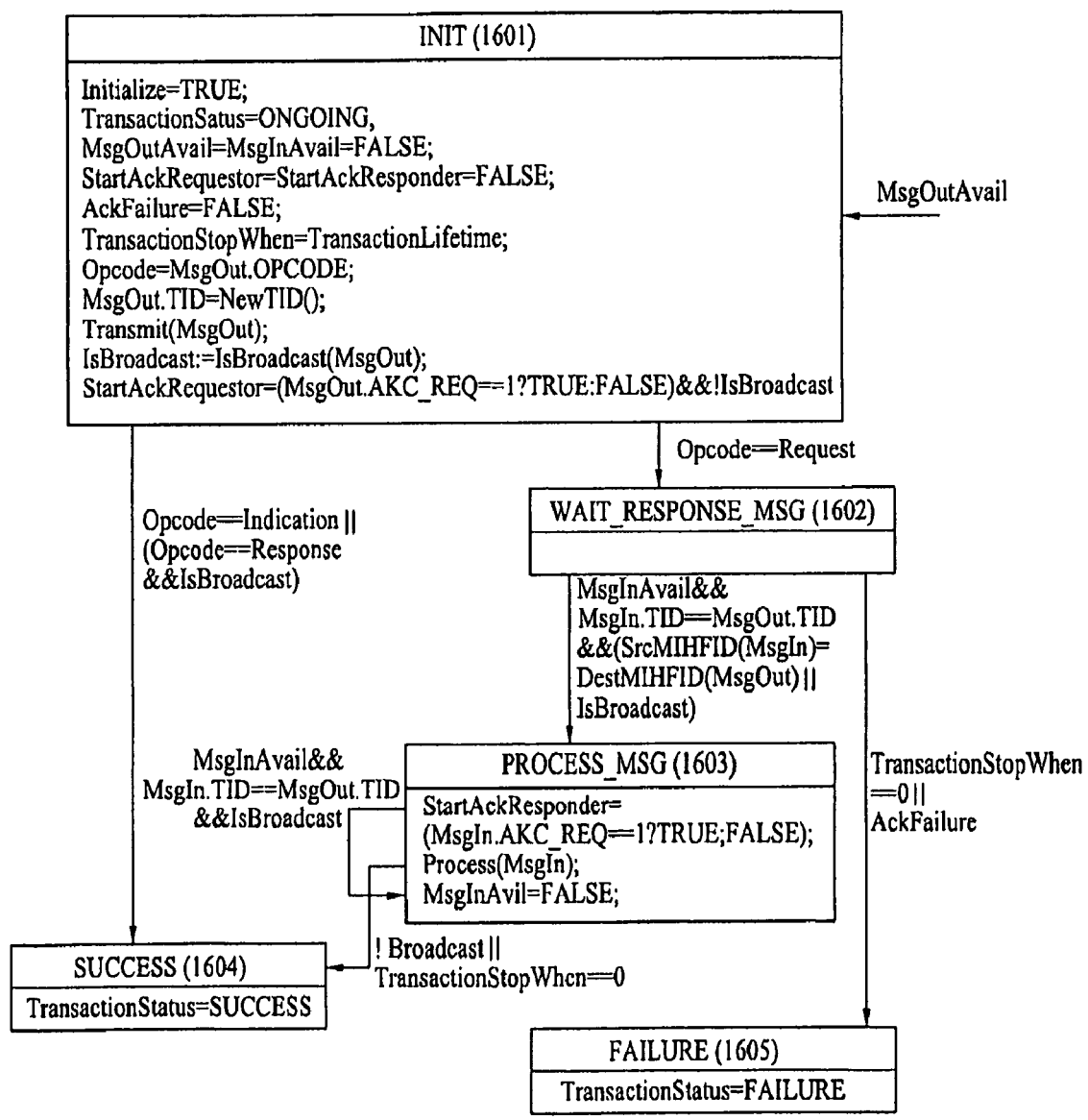
FIG. 16 is a state diagram illustrating an example of a transaction source state machine which may be used in other exemplary embodiments of the present invention.

FIG. 16 is a state diagram illustrating an example of a transaction source state machine which may be used in other exemplary embodiments of the present invention.

The state diagram of FIG. 16 is similar to the state diagram of FIG. 10 except for expression format. Referring to FIG. 16, if a message related to a new transaction is transmitted to a source node, that is, if 'MsgOutAvail' is true, an initial (INIT) state 1601 of the transaction source state machine is started.

If the source node transmits an unsolicited broadcast message in the 'INIT' state 1601, the source node transitions to a 'SUCCESS' state 1604. If the transaction source state machine transitions to the 'SUCCESS' state 1604, a transaction is ended and transition of an ACK related state is also ended.

If an operation code is 'REQUEST' in the 'INIT' state 1601, the source node transmits a broadcast request message and transitions to 'WAIT_RESPONSE_MSG' state 1602. The source node waits for a response message to the broadcast request message.

If a broadcast response message received in the 'WAIT_RESPONSE_MSG' state 1602 relates to the broadcast request message, the source node transitions to 'PROCESS_MSG' state 1603 and processes the received response message. Further, in the 'PROCESS_MSG' state 1603, a repetition process for the response message received from various destination nodes is processed.

After the source node transmits the broadcast request message, if a transaction timer expires, the source node transitions to a 'FAILURE' state 1605 and terminates the process.

Figure 17:
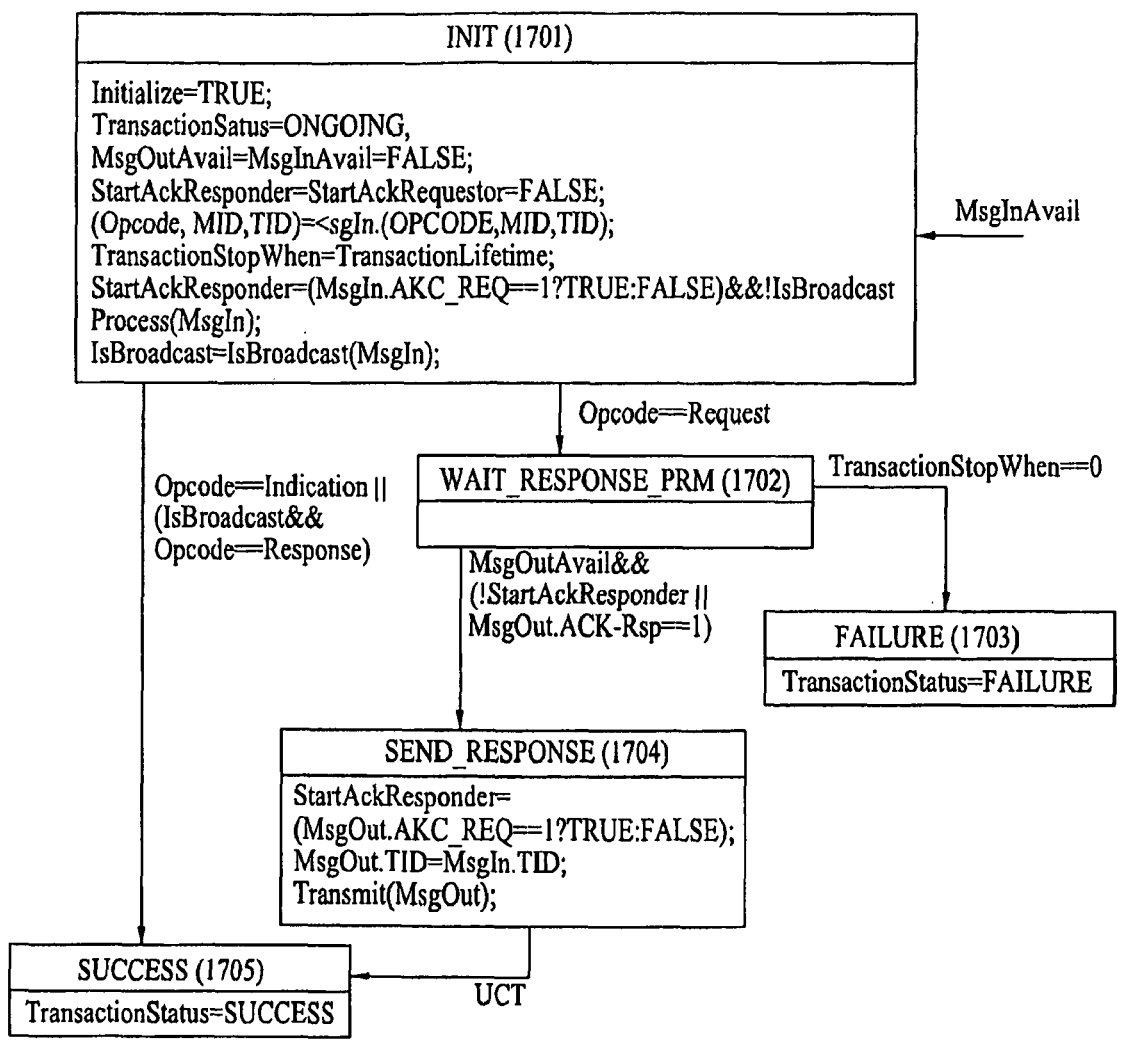
FIG. 17 is a state diagram illustrating an example of a transaction destination state machine which may be used in other exemplary embodiments of the present invention.

FIG. 17 is a state diagram illustrating an example of a transaction destination state machine which may be used in other exemplary embodiments of the present invention.

Referring to FIG. 17, if a message (for example, MsgInAvail) related to a new transaction is transmitted to a destination node, an initial state (INIT) 1701 of the transaction destination state machine is started. If the destination node transitions to a 'FAILURE' state 1703 or a 'SUCCESS' state 1705, a transaction is ended and transition of a related ACK state is also ended.

Upon receipt of an unsolicited request message in the 'INIT' state 1701, the destination node transitions to the 'SUCCESS' state 1705. Upon receiving a broadcast request message in the 'INIT' state 1702, the destination node transitions to a 'WAIT_RESPONSE_PRM' state 1702 to wait for a primitive for generating a response message.

If a time interval of a 'TransactionStopWhen' timer for stopping a transaction expires in the 'WAIT_RESPONSE_PRM' state 1702, the destination node transitions to the 'FAILURE' state 1703. Upon receipt of the primitive for the response message, the source node transitions to a 'SEND_RESPONSE' state 1704 to transmit the response message and transitions to the 'SUCCESS' state 1705.

Hereinafter, an ACK requestor state machine and an ACK responder state machine used in the exemplary embodiments of the present invention are described.

The ACK requestor state machine and the ACK responder state machine may be operated in a source node and a destination node. The ACK requestor state machine and the ACK responder state machine may interact with a transaction source state machine or a transaction destination state machine using local variable or local constants.

The following Table 17 illustrates an example of the local variables used in the exemplary embodiments of the present invention.

TABLE 17

| Name | Type | Description |
| --- | --- | --- |
| DUP | MIH_MESSAGE | This variable is of type MIH_MESSAGE and represents an MIH message which has already been sent. This variable is used within ACK Responder state machine. |
| ACK | MIH_MESSAGE | This variable is of type MIH_MESSAGE and represents an MIH message with the ACK-Rsp bit set and the same message ID and transaction ID as the MIH message it acknowledges. This variable is used within ACK Responder state machine. |
| RtxCtr | UNSIGNED_INT(1) | This variable is of type UNSIGNED_INT (1) and represents a number of retransmissions of a specific message. This variable is used within ACK Requestor state machine. |
| AckDelayTime | UNSIGNED_INT(1) | This variable is of type UNSIGNED_INT (1). It represents the maximum time that an MIH request with Ack-Req set receiver should wait for the generation of an MIH response before sending a ACK message. If the response is available to be sent before AckDelayTime, the Acknowledgement will be piggyback in the response message and there is no need to send ACK message. |

In Table 17, a variable 'DUP' indicates an MIH message that has already been transmitted. The variable 'DUP' may be used in the ACK responder state machine. A variable 'ACK' is an MIH message type and represents the same message ID and a transaction ID by acknowledging an MIH message with an ACK-Req bit set. A variable 'RtxCtr' indicates the number of retransmissions of a specific message and may be used in the ACK requestor state machine. A variable 'AckDelayTime' indicates a maximum time waiting for generation of an MIH response before an ACK message is transmitted upon an MIH request of an ACK-Req set receiver.

The following Table 18 illustrates an example of local constants.

TABLE 18

| Name | Type | Description |
| --- | --- | --- |
| Retransmission Interval | | The time interval between two subsequent transmissions of a specific message. |
| RtxCtrMax | | The maximum number of times that a message will be retransmitted, if retransmission conditions occur. |

In Table 18, a constant 'Retransmission Interval' indicates a time interval between two subsequent transmissions of a specific message. A constant 'RtxCtrMax' indicates the maximum number of retransmissions of a specific message when a retransmission condition occurs. In Table 18, the maximum number of retransmissions and retransmission intervals may vary according to a transmission environment. The maximum number of retransmissions may be determined by a transaction duration time.

Figure 18:
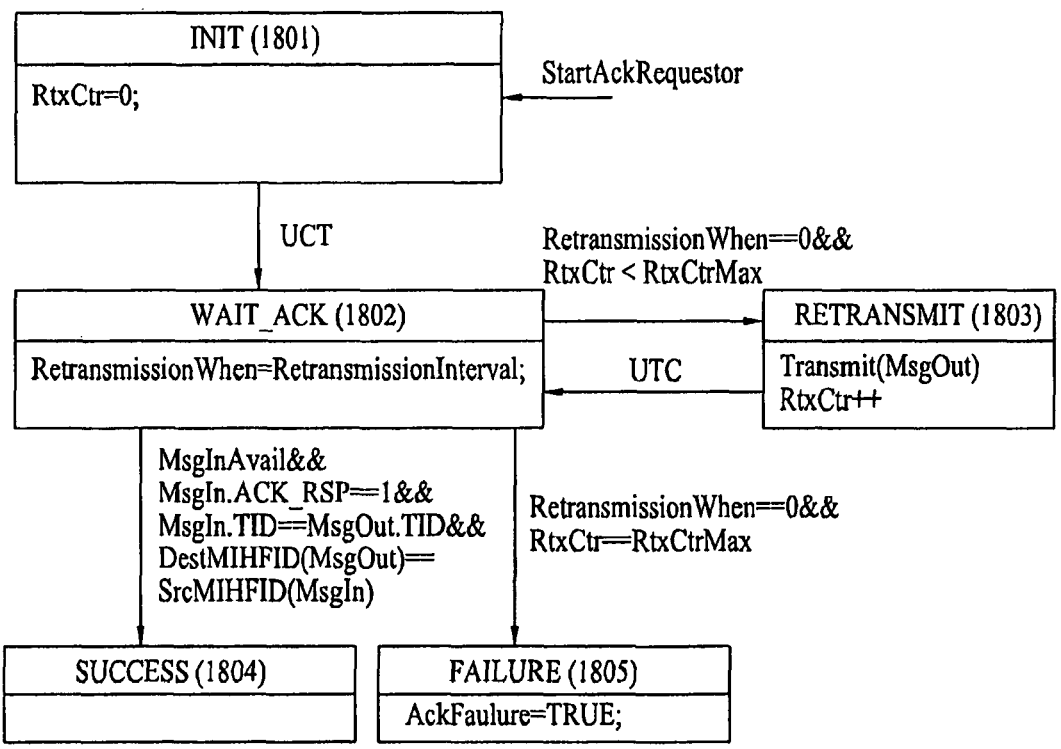
FIG. 18 is a state diagram illustrating an example of an ACK requestor state machine which may be used in other exemplary embodiments of the present invention.

FIG. 18 is a state diagram illustrating an example of an ACK requestor state machine which may be used in other exemplary embodiments of the present invention.

In FIG. 18, the global variables that are set by the state diagram described in FIG. 14 may be used. Alternatively, the local variables or the local constants described with reference to Tables 17 and 18 may be used. Referring to FIG. 18, if a variable 'StartAckRequestor' is true, the ACK requestor state machine starts an initial state (INIT) 1801. If the ACK requestor state machine transitions a 'FAILURE' state 1805 or a 'SUCCESS' state 1804, the ACK requestor state machine is ended.

The ACK requestor state machine transitions from the 'INIT' state 1802 to a 'WAIT_ACK' state 1802. For example, if an ACK-Req bit is used when a destination node transmits an MIH capability discovery response (MIH_Capability_Discovery response) message to a source node in unicast form as a response message to a broadcast MIH capability discovery request (MIH_Capability_Discovery request) message, the initial state 1801 proceeds to the 'WAIT_ACK' state 1802.

If a time interval of a retransmission timer expires, (that is RetransmissionWhen=0), the destination node transitions to a 'RETRANSMIT' state 1803 to retransmit the MIH capability discovery response message. After retransmitting the MIH capability discovery response message, the destination node transitions to a 'WAIT_ACK' state 1802.

If an ACK message is received in the 'WAIT_ACK' state 1802, the destination node transitions to the 'SUCCESS' state 1804. If no ACK message is received, the destination node transitions to the 'FAILURE' state 1805, thereby terminating an ACK request procedure.

Figure 19:
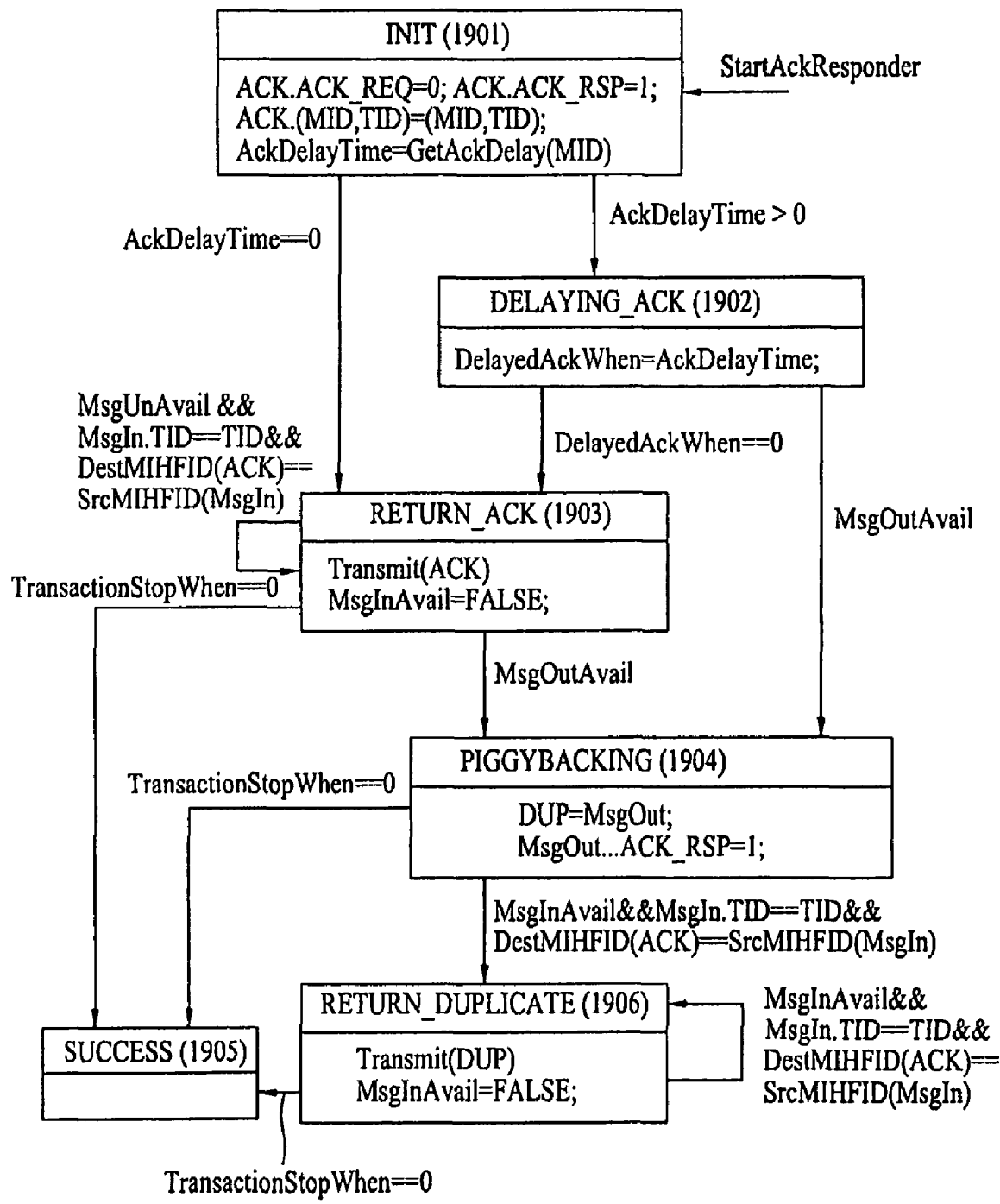
FIG. 19 is a state diagram illustrating an example of an ACK responder state machine which may be used in other exemplary embodiments of the present invention.

FIG. 19 is a state diagram illustrating an example of an ACK responder state machine which may be used in other exemplary embodiments of the present invention.

In FIG. 19, the global variables which are set by the state diagram described in FIG. 14 may be used. Alternatively, the local variables or the local constants described with reference to Tables 17 and 18 may be used. Referring to FIG. 19, if the StartAckResponder (of FIGS. 16 and 17 for example) is true in a state diagram of a source node or a destination node, the ACK responder state machine starts an initial (INIT) state 1901.

If an 'AckDelayTime' time expires in the INIT state 1901 (that is, AckDelayTime=0), the ACK responder state machine transitions to a 'RETURN_ACK' state 1903, and if not (that is, AckDelayTime>0), the ACK responder state machine transitions to a 'DELAYING_ACK' state 1902.

If the 'DELAYING_ACK' state 1902 expires (that is, DelayedAckWhen=0), the ACK responder state machine transitions to the 'RETURN_ACK' state 1903. If there is an outgoing message (that is, 'MsgOutAvail is true), the ACK responder state machine transitions to a 'PIGGYBACKING' state 1904.

If there is an outgoing message in the 'RETURN_ACK' state 1903, the ACK responder state machine transitions to the 'PIGGYBACKING' state 1904. If a time interval of a timer for stopping a transaction in the 'RETURN_ACK' state 1903 expires (that is, TransactionStopWhen=0), the 'RETURN_ACK' state proceeds to a 'SUCCESS' state 1905 and a procedure is ended.

If a time interval of the timer for stopping the transaction expires in the 'PIGGYBACKING' state 1904 (that is, TransactionStopWhen=0), the 'RETURN_ACK' state 1903 goes to the 'SUCCESS' state 1905 and the procedure is ended. If there is an outgoing message in the 'PIGGYBACKING' state 1904 (that is, MsgOutAvail is true), the 'PIGGYBACKING' state proceeds to a 'RETURN_DUPLICATE' state 1906.

If there is no outgoing message in the RETURN_DUPLICATE' state 1906 (that is, MsgInAvail=false), the 'RETURN_DUPLICATE' state 1906 is repeated. If a time interval of the timer for stopping transaction expires (that is, TransactionStopWhen=0), the 'RETURN_DUPLICATE' state 1906 goes to the 'SUCCESS' state 1905 and the procedure is ended.

Figure 20:
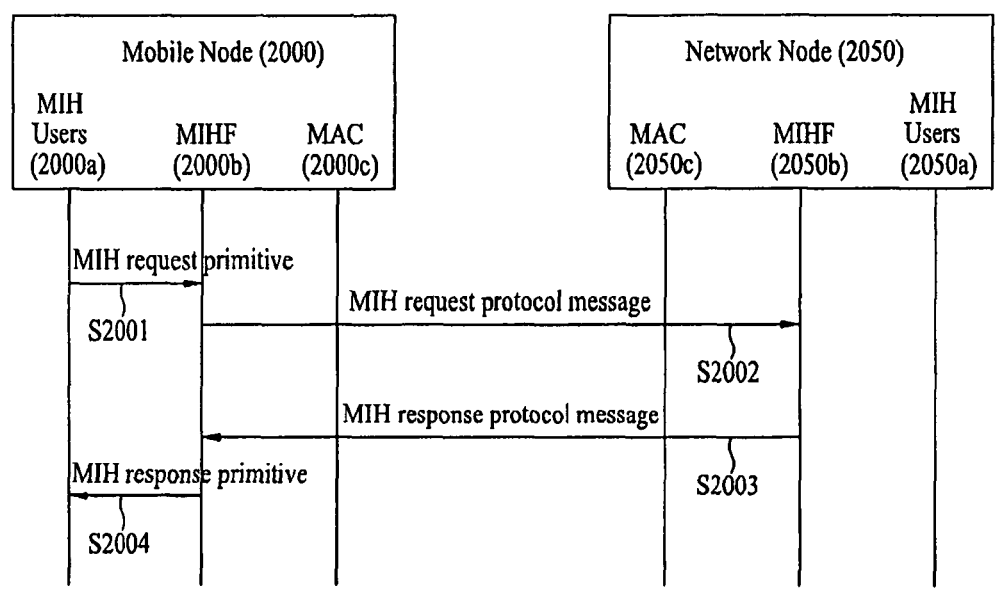
FIG. 20 is a diagram illustrating a method of transmitting an MIH protocol message according to another exemplary embodiment of the present invention.

FIG. 20 is a diagram illustrating a method of transmitting an MIH protocol message according to another exemplary embodiment of the present invention.

In FIG. 20, a mobile node 2000 may include an MIH user 2000a, an MIHF 2000b, and a MAC layer 2000c. A first network node 2050 may include an MIH user 2050a, an MIHF 2050b, and a MAC layer 2050c.

Referring to FIG. 20, the MIHF 2000b receives an MIH request primitive including prescribed information from the MIH user 2000a which is an upper entity (step S2001).

In step S2001, the MIH request primitive may include various information, such as an MIHF ID of a destination and MIH service information provided by a source. For example, if the MIH request primitive is used for a discovery procedure for a different MIHF entity or a discovery procedure for MIH capability, since the MIHF ID of the destination is unknown, a broadcast MIHF ID is used. The broadcast MIHF ID may be in the form of a zero-length string expressed as a sequence of '0's or in the form of 'unknown' format.

The MIHF 2000b of the mobile node transmits an MIH request protocol message including the information received in step S2001 to the network node (step S2002).

In step S2002, the MIH request protocol message may include an MIH header and an MIH payload. An MIHF ID of the mobile node is mapped in a source ID area of the MIH header and an MIHF ID of the destination is mapped in a destination ID area of the MIH header. A transport address of the mobile node and a transport address of the destination are mapped in a transport address area of the MIH header. However, when the MIH discovery and MIH capability discovery procedures are performed, since the MIHF ID of the destination is unknown, a broadcast MIHF ID and a transport address corresponding thereto are mapped instead of information about the destination. When the broadcast MIHF ID is used, the MIH request message is transmitted to adjacent network nodes in the form of a broadcast.

Various information, for example, MIHF capability information of the source, may be included in the MIH payload. The MIHF capability information may include a supported MIH event list, a supported MIH command list, a supported MIH information list, and a supported transport type.

The first network node 2050 which has received the MIH request protocol message generates an MIH response protocol message and transmits the MIH response protocol message to the mobile node (S2003).

In step S2003, the MIH response protocol message may include MIH information of the first network node. For example, the MIH response protocol message includes an MIH header and an MIH payload. The MIH header may include an MIHF ID of the first network and a transport address corresponding thereto. The MIH payload may include MIHF service information supported by the first network node.

However, the MIH request protocol message received by the MIHF 2050b may include not the MIHF ID of the first network node but other MIHF ID. In this case, the MIHF 2050b may disregard the MIH request protocol message. However, an action ID (AID) is included in the MIH header of the MIH request protocol message and the AID shows an activated state, the MIHF of the first network may receive the MIH request protocol message. The AID may be represented as '1' or '1's of a prescribed number to indicate the activated state. There may be various methods of representing that the AID is activated. If the AID indicates '1' even though the MIH request protocol message includes a broadcast MIHF ID instead of the MIHF ID of the MIHF 2050b, the first network can receive the MIH request protocol message and respond to the MIH capability discovery procedure.

In step S2003, the MIH header may include a source ID area, a destination ID area, and a transport address area. The source ID area includes the MIHF ID of the first network node and the destination ID area includes the MIHF ID of the mobile node. A transport address corresponding to the MIHF ID of the mobile node and a transport address corresponding to the MIHF ID of the first network node are mapped in the transport address area. The first network node transmits to the mobile node a response message to which the MIHF ID of the MIHF 2050b and the transport address of the first network node are mapped.

The MIHF 2000b which has received the MIH response protocol message transmits an MIH response primitive to the MIH user 2000a which is an upper entity (step S2004).

In step S2004, the MIH response primitive may include the MIHF ID of the first network node, the transport address, and other MIH information, which are included in the MIH response protocol message. That is, the mobile node can perform the MIHF capability discovery procedure through steps S2001 to S2004. Therefore, the MIH user of the mobile node may utilize information included in the MIH response primitive to transmit the next data.

The MIH request primitive, MIH request protocol message, MIH response primitive, and MIH response protocol message used in FIG. 20 may be employed for various procedures within the scope of the present invention. For example, the respective messages may be used for the MIH capability discovery procedure, MIH registration procedure, MIH capability advertisement procedure, etc. Moreover, the messages may be widely used for messages having the same functions irrespective of the terms.

Figure 21:
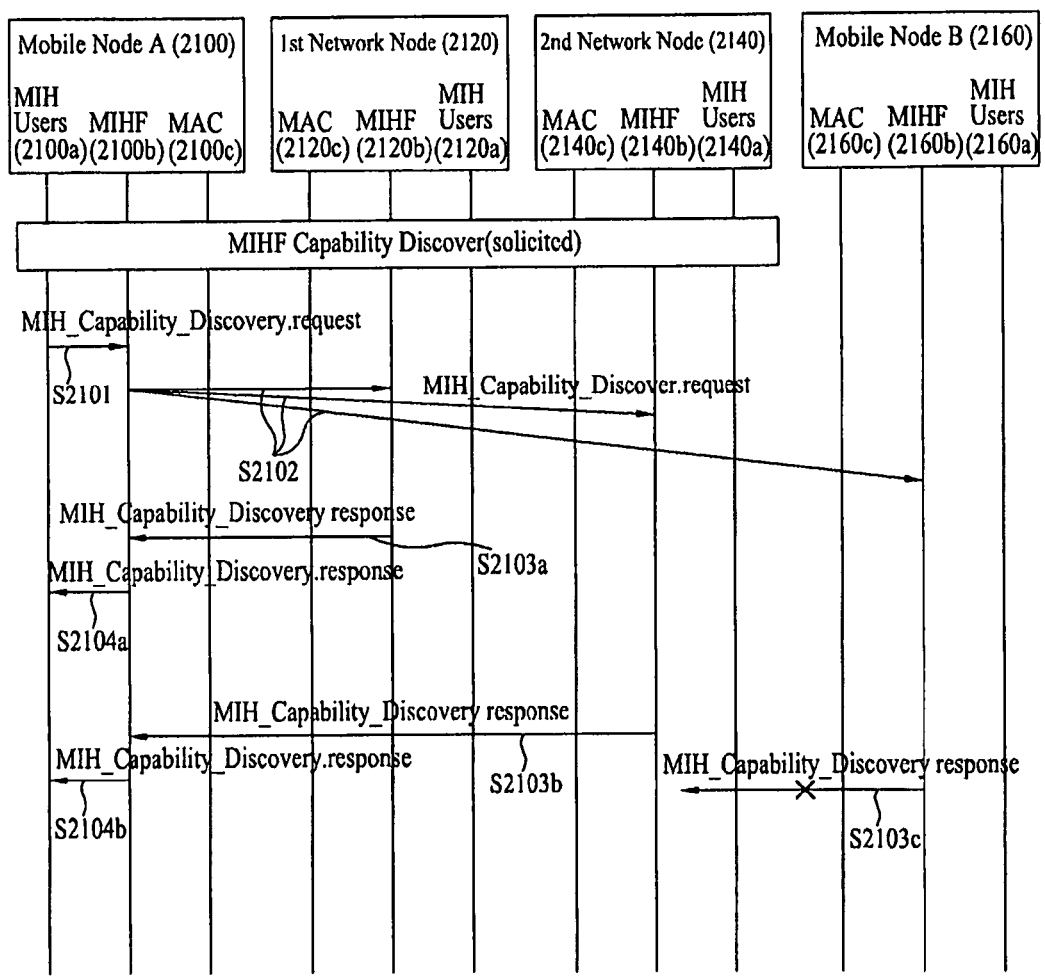
FIG. 21 is a diagram illustrating a method of performing an MIHF capability discovery procedure according to another exemplary embodiment of the present invention.

FIG. 21 is a diagram illustrating a method of performing an MIHF capability discovery procedure according to another exemplary embodiment of the present invention.

In FIG. 21, a mobile node A 2100 includes an MIH user 2100a, an MIHF 2100b, and a MAC layer 2100c. A first network node 2120 includes an MIH user 2120a, an MIHF 2120b, and a MAC layer 2120c. A second network node 2140 includes an MIH user 2140a, an MIHF 2140b, and a MAC layer 2140c. A mobile node B 2160 includes an MIH user 2160a, an MIHF 2160b, and a MAC layer 2160c. The first and second network nodes indicate a plurality of network nodes.

Referring to FIG. 21, the MIH user 2100a, which is an upper entity of the mobile node 2100, transmits an MIH capability discovery request (MIH_Capability_discovery.request) primitive to the MIHF 2100b to discover MIH capability (step S2101).

In step S2101, the MIH capability discovery request primitive is generated when the MIH user 2100a desires to discover the capability of a local or remote MIHF. The MIH user 2100a can selectively piggyback information about the capability of the local MIHF. Therefore, the local MIHF and remote MIHF can know each other's capability through one primitive for capability discovery. Moreover, the MIH capability discovery request primitive may be used in the course of discovering an MIHF ID of a counterpart network node.

The following Table 19 illustrates an example of the MIH capability discovery request (MIH_Capability_discovery.request) primitive.

TABLE 19

| Syntax | Length | Description |
| --- | --- | --- |
| MIH_Capability_discovery.request{ | | |
| Destination_Identifier | | ID of local MIHF or remote MIHF of destination |
| Supported_MIH_Event_List | | Event list supported by MIHF (optional) |
| Supported_MIH_Command_List | | Command list supported by MIHF (optional) |
| Supported_IS_Query_Type_List | | Supported MIIS query type list (optional) |
| Supporter_Transport_List | | Supported transport type list (optional) |
| } | | |

The MIH capability discovery request primitive of Table 2 may be used for the capability discovery request of a remote MIHF and a local MIHF. That is, to discover capability between the mobile node 2100, the first network node 2120, and the second network node 2140, the MIH capability discovery request primitive may include an event service information parameter Supported_MIH_Event_List provided by an MIHF 2100b, a command service information parameter Supported_MIH_Command_List provided by the MIHF, an information service information parameter Supported_Query_Type_List provided by the MIHF, and an supported transport type parameter Supported_Transport_List. However, since the mobile node can not know MIHF IDs of the network nodes, the MIHF ID of a destination included in the MIH capability discovery request primitive remains 'unknown' or uses a broadcast MIHF ID. The broadcast MIHF ID may be expressed in the form of a zero-length string.

Referring to FIG. 21, the MIHF 2100b of the mobile node 2100 broadcasts an MIH capability discovery request (MIH_Capability_Discovery request) message to adjacent MIH entities, that is, to the first network node 2120, the second network 2140, and the mobile node 2160. The MIH capability discovery request message is a protocol message and may be broadcast through a second layer L2 or a third layer L3 (step S2102).

The MIH capability discovery request message may be used to discover an MIHF entity and to obtain capability information of a counter MIHF entity. Therefore, the MIH capability discovery request message is broadcast to all adjacent MIHF entities.

However, if the mobile node does not know an MIHF ID of a destination, the mobile node adds a broadcast MIHF ID to an MIHF ID area of the destination in the MIH capability discovery request message and then broadcasts the MIH capability discovery request message through a data plane of the second or third layer. The broadcast MIHF ID may be set as a zero-length string consisting of a sequence of '0's. If the mobile node knows the MIHF ID of the MIHF entity of the destination, the mobile node may transmit the MIH capability discovery request message including the MIHF ID of the destination through the data plane of the second or third layer in the form of a unicast.

In step S2102, the MIH capability discovery request message includes an MIH header and an MIH payload area. The MIH header may include an MIH header field (SID=1, Opcode=1, AID=1), a source MIHF ID, and a destination MIHF ID. The payload area may include parameters indicating MIH capability provided by the mobile node. That is, the parameters may include a parameter Supported_MIH_Event_List including information about an event service supported by the MIH, a parameter Supported_MIH_Command_List including information about a command service supported by the MIH, a parameter Supported_MIH_IS_Query_Type_List including an information service supported by the MIH, and a parameter Supported_Transport_List indicating a transport type. Thus, the mobile node 2100 and the MIHF entities of the adjacent network nodes can discover each other's MIH capability by exchanging the MIH protocol message and can share information about each other's MIH capability.

The first network node 2120 and the second network node 2140 which have received the MIH capability discovery request message from the mobile node 2100 transmit an MIH capability discovery response (MIH_Capability_Discovery response) message to the mobile node 2100 (step 2103a and step 2103b).

Upon receiving the MIH capability discovery request message, the MIHFs 2120b and 2140b confirm a destination ID contained in the MIH capability discovery request message. If an action code AID included in the MIH header of the MIH capability discovery request message is set to '1' even though the destination MIHF ID does not include MIHF IDs of the MIHFs 2120b and 2140b, the MIHFs 2120b and 2140b receives the MIH capability discovery request message and can prepare a response message to the MIH capability discovery request message.

In step 2103a, the MIH capability discovery response message includes an MIH payload and an MIH header. The MIH payload may include information about an MIH service provided by the first network node. That is, the MIH payload may include an MIH event service parameter, an MIH command service parameter, and an MIH information service parameter. Furthermore, an MIHF ID of a mobile node may be mapped in a destination MIHF ID area of the MIH header and an MIHF ID of the first network node may be mapped in a source MIHF ID area of the MIH header. A transport address corresponding to an MIHF ID of the first network node which is a source and a transport address corresponding to an MIHF ID of the mobile node which is a destination may be mapped in a transport address area of the MIH header.

Step 2103b is the same as or similar to step 2103a, and therefore a detailed description thereof is omitted.

The MIHF 2100b which has received the MIH capability response message from the first network node transmits information included in the MIH capability discovery response message to the MIH user 2100a which is an upper entity. To transmit the MIH information, an MIH capability discovery response (MIH_Capability_Discovery.response) primitive may be used (step S204a).

The following Table 20 illustrates an example of the MIH capability discovery response primitive.

TABLE 20

| Syntax | Length | Description |
| --- | --- | --- |
| MIH_Capability_discovery.response{ | | |
| Destination_Identifier | | MIHF ID of a destination |
| Supported_Links | | Supported network type list |
| Link_MACs | | Network type and MAC address |
| Supported_MIH_Event_List | | Event service list supported by an MIHF |
| Supported_MIH_Command_List | | Command service list supported by an MIHF |
| Supported_IS_Query_type_List | | Supported MIIS query type list (optional) |
| Supported_Transport_List | | Supported transport type list (optional) |
| MBB_Handover_Support | | Indicates whether MBB handover is supported |
| Status | | Operational status |
| } | | |

The MIH capability discovery response primitive of Table 20 includes a parameter Destination_Identifier indicating an ID of an MIHF entity of a destination, a parameter Supported_Links indicating a supported network type, a parameter Link_MACs including a network type and a MAC address, a parameter Supported_MIH_Event_List including an event service list supported by a destination MIHF, a parameter Supported_MIH_Command_List including a command service list supported by the destination MIHF, a parameter MBB_Handover_Support indicating whether MBB handover is supported, and a parameter Status indicating an operational status. The MIH capability discovery response primitive may selectively include a parameter Supported_IS_Query_Type_List and a parameter Supported_Transport_List.

Step S2104b is to transmit the MIH capability discovery response primitive to the MIH user 2100a which is an upper entity. Step S210b is the same as or similar to step 2104a and therefore a detailed description thereof is omitted.

Referring to FIG. 21, the mobile node 2160 has also received the MIH capability discovery request message from the mobile node 2100 in step S2102. However, the mobile node 2160 contained in the same broadcast domain is prohibited from transmitting a response message even though the mobile node 2160 has received the MIH capability discovery request message from the mobile node 2100 (step S2103c). Therefore, information as a broadcast message can not be shared between the mobile nodes.

Figure 22:
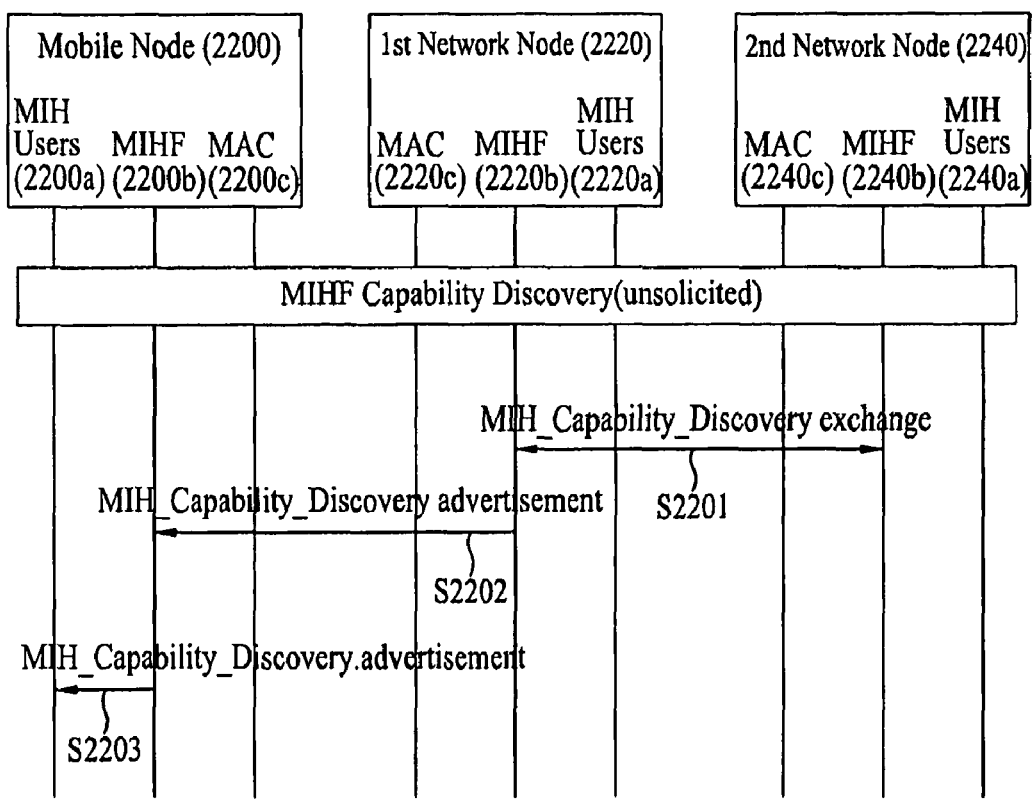
FIG. 22 is a diagram illustrating a method of discovering MIH capability of another network node from a currently connected network node through an MIH capability discovery broadcast message, according to another exemplary embodiment of the present invention.

FIG. 22 is a diagram illustrating a method of discovering MIH capability of another network node from a currently connected network node through an MIH capability discovery broadcast message, according to another exemplary embodiment of the present invention.

In FIG. 22, a mobile node 2200 includes an MIH user 2200a, an MIHF 2200b, and a MAC layer 2200c. A first network node 2220 includes an MIH user 2220a, an MIHF 2220b, and a MAC layer 2220c. A second network node 2240 includes an MIH user 2240a, an MIHF 2240b, and an MAC layer 2240c. The first and second networks indicate a plurality of network nodes.

In other exemplary embodiments of the present invention, a method is described of periodically providing MIH capability information to a mobile node through a periodic advertisement message from a network node without transmitting a request message for the MIH capability discovery of the mobile node.

It is assumed in FIG. 22 that the first network node 2220 and the second network node 2240 are connected to each other through a backbone network. Accordingly, the first and second network nodes can exchange each other's MIH capability information using an MIH capability discovery exchange (MIH_Capability_Discovery exchange) message. The MIH capability discovery exchange message is a remote protocol message, and the first and second network nodes can exchange each other's MIHF IDs and transport addresses (step S2201).

Through step S2201, the first network node can know MIH capability information which is supported by the second network node. Therefore, the first network node transmits information about MIH capability provided by the second network node to the mobile node 2200 in the form of a unicast through an MIH capability discovery advertisement (MIH_Capability_discovery advertisement) message which is periodically transmitted (step S2202).

In FIG. 22, the mobile node 2200 illustrates one of nodes connected to the first network node. A mobile node which is not connected to the first network node can not receive the MIH capability discovery advertisement message from the first network node.

In step S2202, an MIHF ID of the mobile node and an MIHF ID of the first network node may be included in an MIH header of the MIH capability discovery advertisement message. At this time, the MIHF ID of the first network node is mapped in a source ID area of the MIH header, and the MIHF ID of the mobile node is mapped in a destination ID area of the MIH header. Further, MIH transport addresses corresponding to MIHF IDs of the MIHF 2220b and MIHF 2200b are mapped in a transport address area of the MIH header. Since the mobile node and the first network node are connected to each other, the mobile node and the first network node know each other's MIHF ID and transport address.

In step S2202, since the first network node know MIH information of the second network node, the first network node transmits to the mobile node the MIH capability discovery advertisement message including an MIHF ID and a transport address of the second network node.

The MIHF 2200b of the mobile node transmits an MIH capability discovery advertisement (MIH_Capability_Discovery advertisement) primitive to the MIHF user 2200a, which is an upper entity, in order to provide MIH capability information which is supportable by the second network node (step S2203). The MIH capability discovery advertisement primitive is a local primitive.

Figure 23:
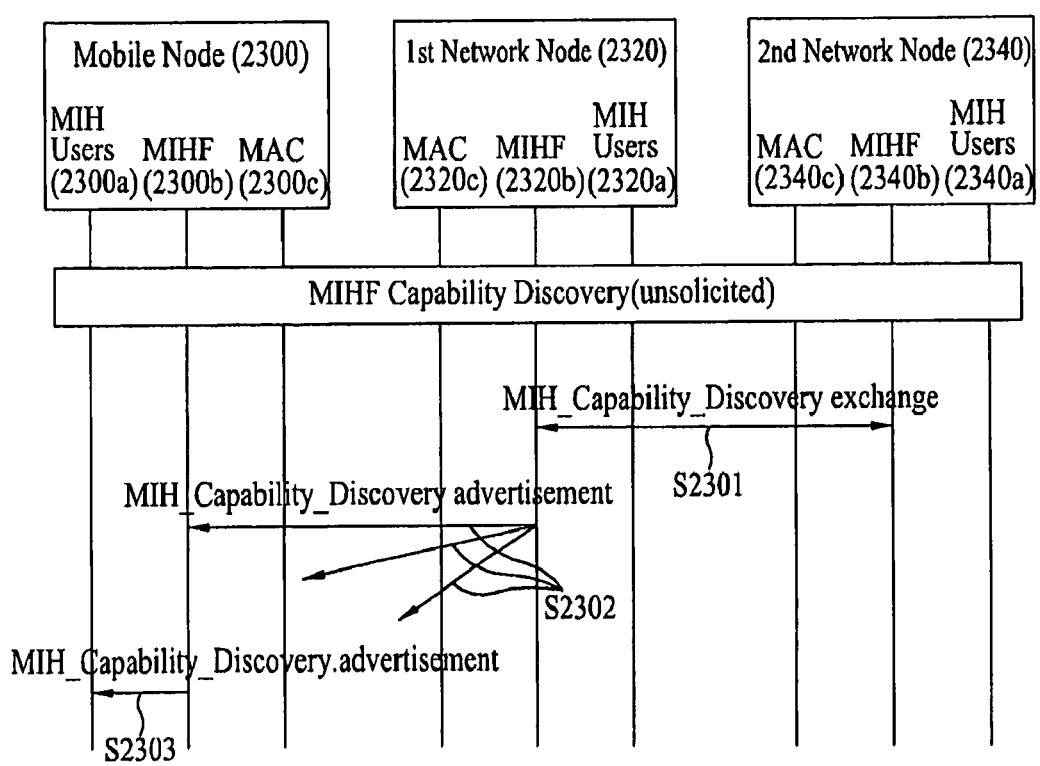
FIG. 23 is a diagram illustrating a method of obtaining MIH capability information of a second network from a first network node through an MIH capability discovery advertisement message, according to another exemplary embodiment of the present invention.

FIG. 23 is a diagram illustrating a method of obtaining MIH capability information of a second network from a first network node through an MIH capability discovery advertisement message, according to another exemplary embodiment of the present invention.

In FIG. 23, a mobile node 2300 includes an MIH user 2300a, an MIHF 2300b, and a MAC layer 2300c. A first network node 2320 includes an MIH user 2320a, an MIHF 23320b, and a MAC layer 2320c. A second network node 2340 includes an MIH user 2340a, an MIHF 2340b, and a MAC layer 2340c. The first and second network nodes illustrate a plurality of network nodes.

FIG. 23 shows a method of providing MIH capability information, etc. to the mobile node by broadcasting an MIH capability discovery advertisement message by the first network even though the mobile node does not request MIH capability discovery.

It is assumed that the first network node 2320 and the second network node 2340 are connected to each other through a backbone network. Other means for connecting network entities may be used instead of the backbone network. Therefore, the first and second network nodes can exchange each other's MIH capability information using an MIH capability discovery exchange (MIH_Capability_Discovery exchange) message. The MIH capability discovery exchange message is a remote protocol message, and the first and second network nodes can exchange each other's MIHF ID and transport address (step S2301).

Through step S2301, the first network node can discovery MIH capability information which is supported by the second network node. Therefore, the first network node transmits information about MIH capability provided by the second network node to the mobile node 2300 in the form of a broadcast through an MIH capability discovery advertisement (MIH_Capability_discovery advertisement) message (step S2302). At this time, the mobile node may be any equipment including an MIHF entity adjacent to the first network node.

In step S2302, an MIHF ID of a destination and an MIHF ID of a source may be included in MIHF ID areas contained in an MIH header of the MIH capability discovery advertisement message. An MIHF ID of the first network node is mapped in a source MIHF ID area of the MIH header, and a broadcast MIHF ID is mapped in a destination MIHF ID area of the MIH header. The broadcast MIHF ID may be mapped in the form of a zero-length string consisting of a sequence of '0's.

A transport address corresponding to the MIHF 2320b and a transport address corresponding to the broadcast MIHF ID are mapped in a transport address area of the MIH header. Moreover, an action ID (AID) may be included in the MIH header. If the AID represents '1' even though the MIH capability discovery advertisement message does not include the MIHF ID of the MIHF 2300b, the mobile node can receive the MIH capability discovery advertisement message.

In step S2302, since the first network node knows MIH information of the second network node, the first network can broadcast the MIH capability discovery advertisement message including an MIHF ID and transport address of the second network to the mobile node.

To transmit MIH capability information which can be provided by the first or second network node, the MIHF 2300b of the mobile node transmits an MIH capability discovery advertisement (MIH_Capability_Discovery advertisement) primitive to the MIHF user 2300a which is an upper entity. The MIH capability discovery advertisement primitive is a local primitive.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to various mobile communication systems.

The invention claimed is:

1. A method of transmitting a media independence handover (MIH) request message by a source media independence handover function (MIHF) entity, the method comprising:
   broadcasting the MIH request message through a data plane to at least one unknown destination MIHF entity, the MIH request message including a predefined MIHF identifier (ID) configured as a predefined zero-length in a destination ID area;
   setting a timer after broadcasting the MIH request message; and
   receiving at least one MIH response message in response to the broadcasted MIH request message from the at least one unknown destination MIHF entity during an interval set by the timer,
   wherein the source MIHF entity broadcasts the MIH request message using a different transport type if the at least one MIH response message is not received during the interval set by the timer.

2. The method according to claim 1, wherein the MIH request message is one of an MIH discovery request message for discovering an MIHF ID of the unknown destination MIHF entity and an MIHF capability discovery request message for discovering MIH capability of the unknown destination MIHF entity.

3. The method according to claim 1, wherein the MIH request message is used to discover an MIHF ID and MIH capability of the unknown destination MIHF entity.

4. The method according to claim 1, wherein the data plane is one of a second layer data plane and a third layer data plane.

5. The method according to claim 1, wherein the MIH request message includes a source MIHF ID, a broadcast MIHF ID, source address information, and source MIH capability information in an MIH header.

6. The method according to claim 5, wherein the source MIH capability information includes an MIH event list, an MIH command list, an MIH information list, and an MIH transport list that are supported by the source MIHF entity.

7. An apparatus for transmitting a media independent handover (MIH) request message, the apparatus comprising:
   a timer; and
   a Media Independent Handover Function (MIHF) entity configured to broadcast the MIH request message through a data plane to at least one unknown destination MIHF entity, the MIH request message including a predefined MIHF identifier (ID) configured as a predefined zero-length in a destination ID area; configured to control setting the timer after to broadcast the MIH request message; and configured to receive at least one MIH response message in response to the broadcasted MIH request message from the at least one unknown destination MIHF entity during an interval set by the timer,
   wherein the MIHF entity is configured to broadcast the MIH request message using a different transport type if the at least one MIH response message is not received during the interval set by the timer.

8. The apparatus according to claim 7, wherein the data plane is one of a second layer data plane and a third layer data plane.

9. The apparatus according to claim 7, wherein the MIH request message is one of an MIH discovery request message for discovering an MIHF ID of the unknown destination MIHF entity and an MIHF capability discovery request message for discovering MIH capability of the unknown destination MIHF entity.

10. The apparatus according to claim 7, wherein the MIH request message is used to discover an MIHF ID and MIH capability of the unknown destination MIHF entity.

11. The apparatus according to claim 7, wherein the MIH request message includes a source MIHF ID, a broadcast MIHF ID, source address information, and source MIH capability information in an MIH header.

12. The apparatus according to claim 11, wherein the source MIH capability information includes an MIH event list, an MIH command list, an MIH information list, and an MIH transport list that are supported by the MIHF entity.

* * * * *